(12) United States Patent
Krtolica

(10) Patent No.: US 6,763,137 B1
(45) Date of Patent: Jul. 13, 2004

(54) RECOGNITION AND CLUSTERING OF CONNECTED COMPONENTS IN BI-LEVEL IMAGES

(75) Inventor: Radovan V. Krtolica, Los Gatos, CA (US)

(73) Assignee: Canon Kabushiki Kaisha, Tokyo (JP)

(*) Notice: Subject to any disclaimer, the term of this patent is extended or adjusted under 35 U.S.C. 154(b) by 653 days.

(21) Appl. No.: 09/661,865

(22) Filed: Sep. 14, 2000

(51) Int. Cl.$^7$ .................. G06K 09/46; G06K 09/36; G06K 9/45
(52) U.S. Cl. .................. 382/204; 382/245; 717/144
(58) Field of Search .................. 382/173, 177–179, 382/180–190, 197, 201, 204, 245; 358/1.9, 467; 717/144

(56) References Cited

U.S. PATENT DOCUMENTS

| | | | |
|---|---|---|---|
| 5,025,479 A | 6/1991 | Pastor | 382/38 |
| 5,067,165 A | 11/1991 | Nishida | 382/19 |
| 5,522,022 A * | 5/1996 | Rao et al. | 345/440 |
| 5,528,701 A * | 6/1996 | Aref | 382/178 |
| 5,537,491 A * | 7/1996 | Mahoney et al. | 382/218 |
| 5,644,648 A | 7/1997 | Bose | 382/177 |
| 5,982,923 A * | 11/1999 | Kim et al. | 382/154 |
| 5,982,929 A * | 11/1999 | Ilan et al. | 382/200 |
| 6,091,424 A * | 7/2000 | Madden et al. | 345/619 |
| 6,275,611 B1 * | 8/2001 | Parthasarathy | 382/187 |
| 6,418,239 B1 * | 7/2002 | Hullender et al. | 382/229 |

OTHER PUBLICATIONS

Baraghimian, "Connected component labeling using self-organizing feature maps", I.E.E.E. Computer Software and Application Conference, 1989; pp. 680–684.*

Tong, "Data Structure for segmenting binary image", I.E.E.E Proceedings. Computer, Communication Control and Power Engineering, 1993; pp. 1146–1149 vol. 2.*

Chieavetta, "Digital Connectedness via connectivity graph", I.E.E.E Pattern Recognition, 1992; pp. 646–649.*

Suzuki, "Graph–based vectorization method for line patterns", I.E.E.E Computer Vision and Pattern Recognition, 1988; pp. 616–621.*

Author unknown, "Standardization of Group 3 Facsimile Terminals For Document Transmission", International Telecommunication Union, Recommendation T.4, Apr. 1999.

Author unknown, "Facsimile Coding Schemes and Coding Control Functions For Group 4 Facsimile Apparatus", International Telecommunication Union, Recommendation T.6, 1988, 1993.

Srihari, Sargur N., et al., "Pattern Recognition: A Survey", The Encyclopedia of Computer Science and Engineering, $3^{rd}$ Ed., 1992.

T.Y. Young, et al., Classification, Estimation and Pattern Recognition, American Elsevier Publishing Co., NY, 1974, pp. 143–145.

U.S. Application No. 09/149,732, by R. Krtolica and S. Ng, entitled "Segmenting and Recognizing Bi–Level Images", filed Sep. 8, 1998, abandoned.

* cited by examiner

*Primary Examiner*—Samir Ahmed
*Assistant Examiner*—Brian Le
(74) *Attorney, Agent, or Firm*—Fitzpatrick, Cella, Harper & Scinto

(57) ABSTRACT

Methods, apparatus and data structures for identifying, processing and interpreting bi-level connected component objects found within graphic images. The disclosure includes methods for generating lumped graph representations (4100) of the targeted objects (3000) and for using these to recognize the objects as known objects in a reference dictionary (10010). To implement this method, a bi-level connected component object (3000) is identified within an image (2010) and the object is represented as a plurality of pixel runs (3100–3430) of a given binary value. A lumped graph representation (4100) which captures characteristic topological features of the object is created based upon the connectivity data of the pixel runs in the object. This information is then used to recognize the object (3000) by comparing the lumped graph feature vectors with feature vectors of known objects stored in the dictionary (10010). Optionally, the dictionary (10010) can be updated such that newly recognized objects can be added to the dictionary (10010) for future recognition purposes.

29 Claims, 22 Drawing Sheets

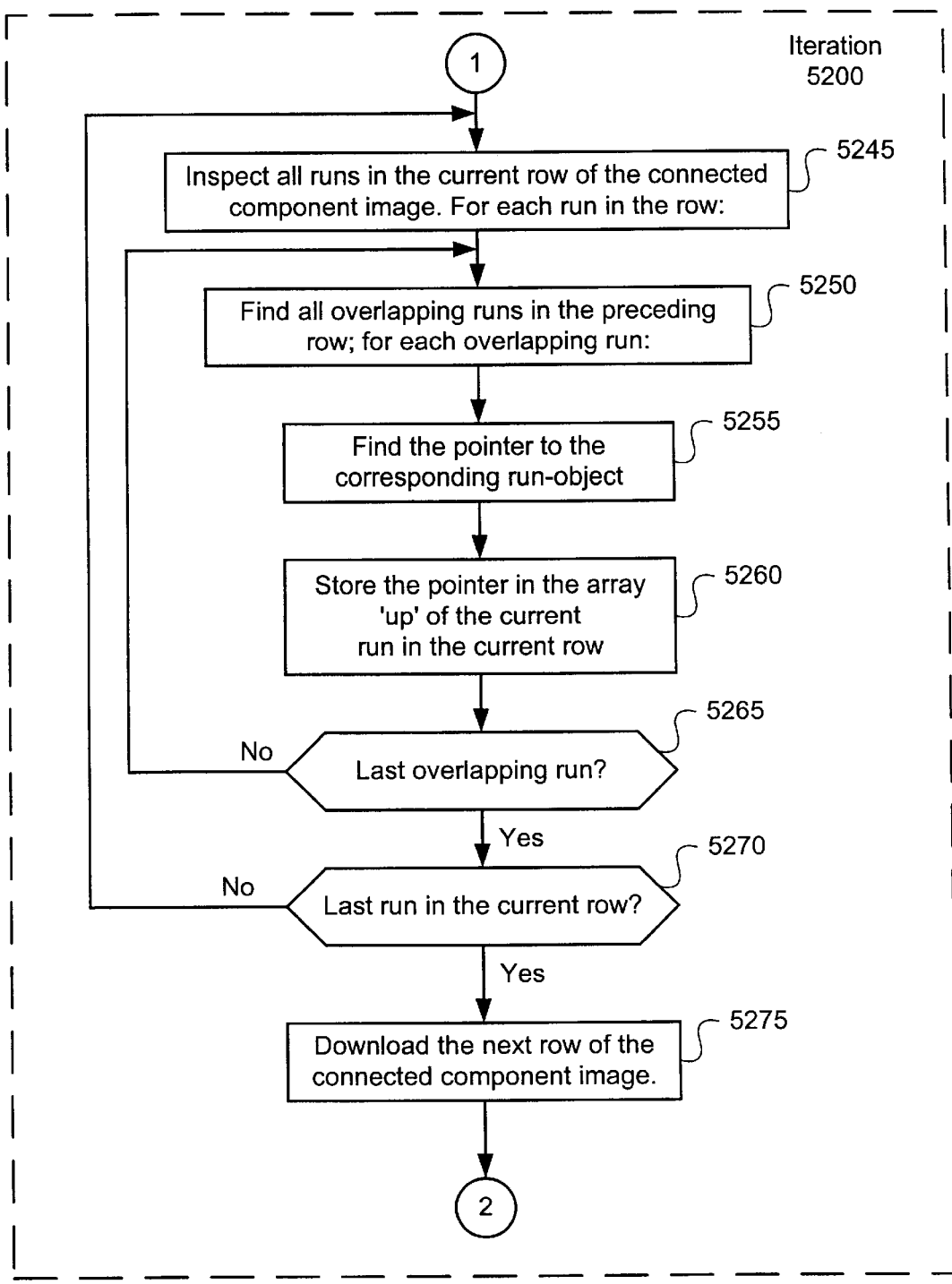
FIG. 5(a')

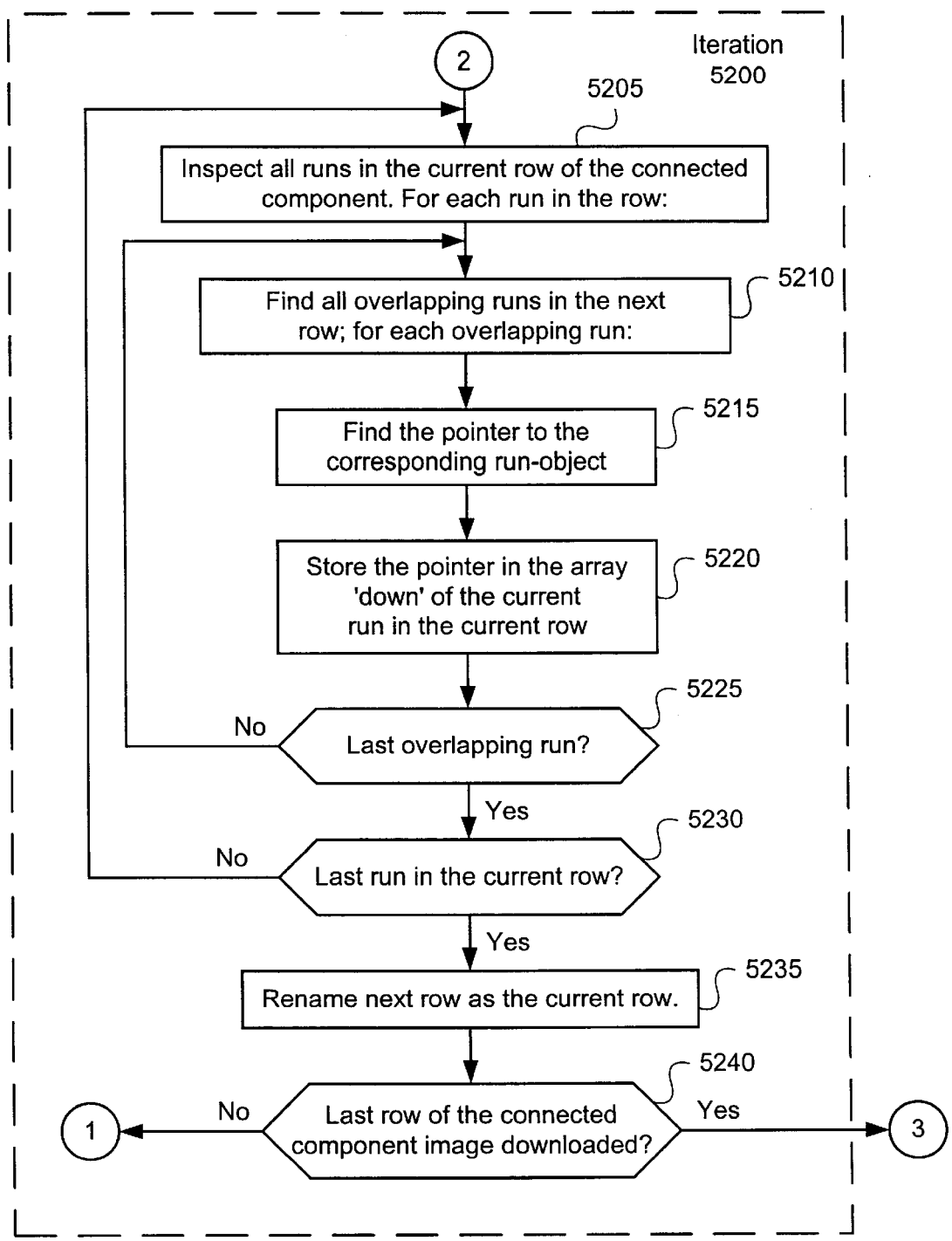
FIG. 5(a")

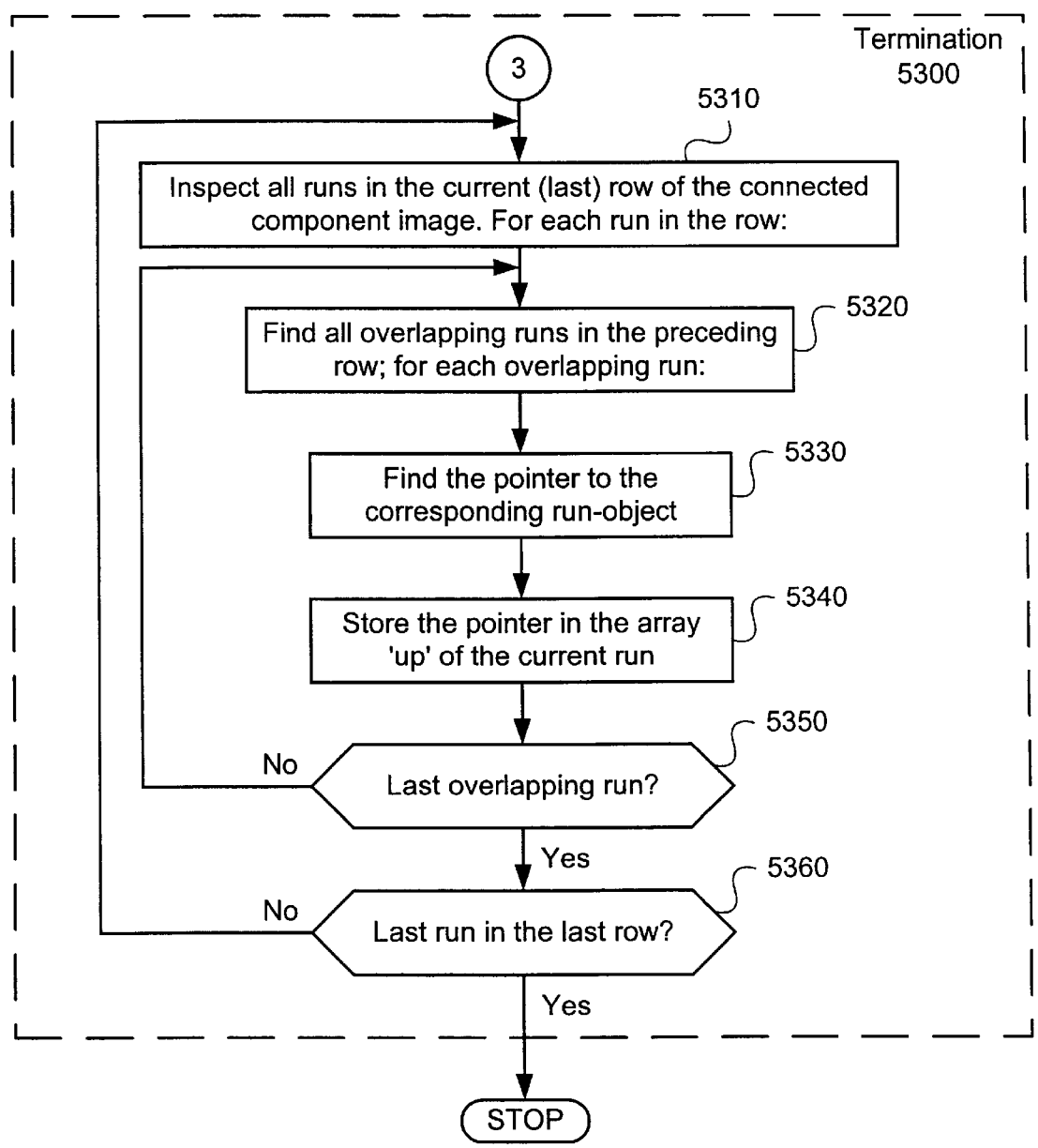
FIG. 5(a''')

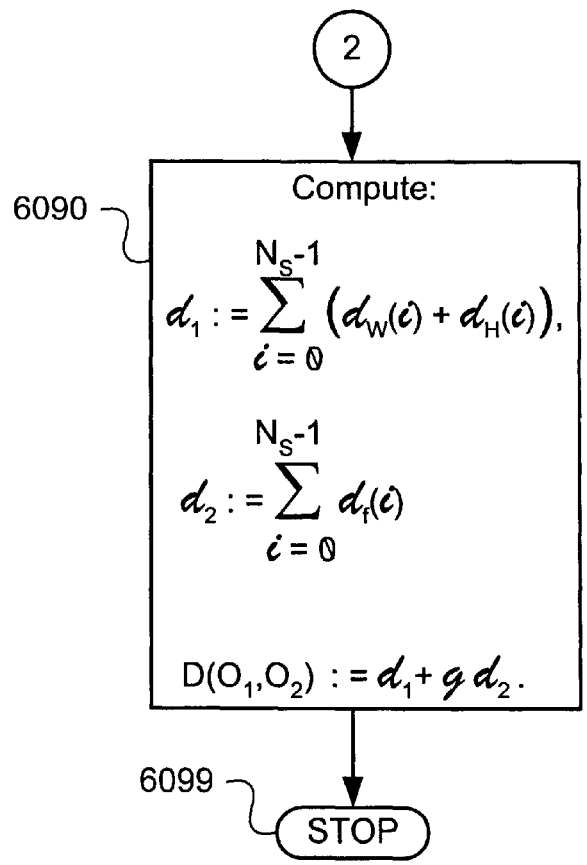
FIG. 6"

RECOGNITION AND CLUSTERING OF CONNECTED COMPONENTS IN BI-LEVEL IMAGES

BACKGROUND OF THE INVENTION

1. Field of the Invention

The present invention pertains to the field of image analysis, and more particularly to bi-level image segmentation, characterization and recognition. Accordingly, the general objects of the invention are to provide novel methods, apparatus and data structures of such character.

2. Description of Related Art

In the field of image analysis, image recognition requires segmentation and interpretation of connected component objects found within an image. For bi-level images, a connected component object is a group of pixels of a given binary value, (e.g., 1 or black), completely surrounded by a group of pixels of the alternative binary value (e.g., 0 or white). Methods and apparatus for identifying connected component objects within an image, e.g. by performing line-by-line connected component analysis, are known in the art. One such example is disclosed in U.S. patent application Ser. No. 09/149,732, entitled "Segmenting and Recognizing Bi-level Images," filed on Sep. 8, 1998 and assigned to the same assignee as the present invention; this patent application is incorporated by reference in its entirety in the present application.

Following connected component segmentation (or identification), image recognition typically proceeds by extracting a set of features for each connected component object which is needed by a given classification method to uniquely recognize a targeted object. Once this object data has been extracted, well known character recognition methods such as Bayesian, nearest neighbor, and neural network analysis may be used to classify each object by comparing object features with features obtained from a list of reference objects. When the features are similar enough, the unknown object is recognized and the known reference object can be substituted for the previously unknown object during further document manipulation.

While various character recognition methods using feature extraction methods are known in the art, an intuitive, easy to implement, and comprehensive method for feature extraction is notably absent. Additionally, improvements in object recognition speed and accuracy are still desirable. What is needed, therefore, are systematic and comprehensive procedures, apparatus and data structures that capture more of the information inherent in a given connected component object and make it available for subsequent manipulation (e.g., to improve character recognition).

Another deficiency of the related art is that inordinate effort is spent in conventional image recognition attempting to correct transmission or scanning errors which result in connected component objects which are the unrecognizable derivatives of known objects. One common error typically sought to be corrected is the cutting of a recognizable connected component object into two or more unrecognizable objects. For example, character cutting errors may result in the detection of three unrecognizable objects /, -, and \, rather than the single recognizable object, A. Another common error of this nature is the connecting of two or more separately recognizable connected component objects into a single, unrecognizable, object.

With a list of known objects that is limited to the letters of the English alphabet, a typical character recognition method would fail to recognize the sequence of unrecognized objects /, -, and \, as the letter A. What is also needed, therefore, are methods, apparatus and data structures for automatically recognizing future instances of currently unrecognizable connected component objects by adding those objects into a dictionary of reference objects. One of the many advantages of such a development would be that repetitive cutting and connecting errors, etc. would no longer be an impediment to character recognition.

DISCLOSURE OF INVENTION

One aspect of the present invention is directed to simple and effective methods, apparatus and data structures to identify bi-level connected component objects found within document images. This aspect of the invention includes intuitive and easily implemented methods for generating novel graphic representations having topographical feature vectors which correspond to connected component objects. In accordance with this aspect of this invention, these graphs can be used to recognize or interpret the objects as objects in a reference dictionary with a high degree of efficiency and accuracy.

In particular, this aspect of the present invention identifies individual connected component objects (3000), extracts pixel data (3100–3430) for each object, determines the connectivity relationships between various pixel runs and records the same into novel data structures (4200). The resulting data corresponds to simplified lumped graphs (or L-graphs) (4100) which use three or more types of nodes to capture characteristic feature vectors of the objects. In such embodiments, the feature vectors of the lumped graphs are compared directly to the feature vectors of the objects (11160) in a reference dictionary (10010). When the feature vectors are sufficiently similar, the object comparator (2070) recognizes or interprets the object as a known object and uses the simplified representation (11190) of the known object for future data processing. Conversely, when the feature vectors are sufficiently dissimilar, the object comparator (2070) preferably sends a message requesting additional assistance in recognizing the object. If the object is recognized with additional assistance, a dictionary updater can add the object to the dictionary of known objects for automatic recognition purposes in the future. As a result of the novel lumped graphs and data structures, the invention enables the use of novel object recognition techniques which offer more flexibility, higher processing speed and greater accuracy in the recognition process.

A particularly preferred aspect of the present invention is directed to more sophisticated methods, apparatus and data structures for interpreting bi-level connected component objects found within documents. Such methods use the same simplified lumped graphs as the embodiments described above. However, once lumped graphs of plural objects have been generated, their feature vectors are compared with one another and objects which meet a minimum level of similarity are clustered together. Additionally, objects which are representative of each cluster are selected and compiled into a library (2050) of cluster representatives. These representative objects are then compared to the known objects in the reference dictionary (10010).

In particular, these embodiments of the invention preferably match each cluster representative to a dictionary object by comparing its feature vector with the feature vectors of known objects stored in the dictionary of known objects. When the cluster representatives have been interpreted as known objects, the remaining members of each respective cluster can also be equated with the respective known objects in the dictionary. The data (now interpreted) from the image can then be outputed as a series of known objects.

Still other aspects of the present invention are directed to generating the lumped graph representations of the targeted objects and to advantageously store data for these objects. In particular, the lumped graphs are generated by capturing the connectivity relationships between pixel runs in the connected component. This data can then be used to create the simplified lumped graphs. These lumped graphs are preferably simplified by identifying adjacent pixel runs which have identical connectivity relationships and then replacing these disparate bits of data with a single edge or stroke.

The data structure embodiments of the invention are particularly well suited to generating and storing object data which corresponds to the lumped graph representations of connected component objects. For example, these data structures are capable of capturing pixel run connectivity data which is used to define various nodes of each lumped graph. Additionally, they are capable of capturing simplified object data in the form of strokes or edges which represent a plurality of pixel runs having identical connectivity relationships. Thus, the data structure of the invention makes more of the information which defines connected components objects available for manipulation (e.g., during object interpretation).

BRIEF DESCRIPTION OF THE DRAWINGS

These and other more detailed and specific objects and features of the present invention are more fully disclosed in the following written description and accompanying drawings, in which:

FIG. 4b illustrates a novel data structure for characterizing connected component objects such as that of FIG. 3a, the data structure corresponding to the L-graph shown in FIG. 4a;

DETAILED DESCRIPTION OF THE PREFERRED EMBODIMENTS

One aspect of the present invention is directed to computer apparatus for interpreting bi-level connected component objects found within a scanned document or image. This aspect of the invention entails extracting feature vectors from the targeted connected component object and recognizing or interpreting that object as a known object in a reference dictionary of known objects.

Figure 1:
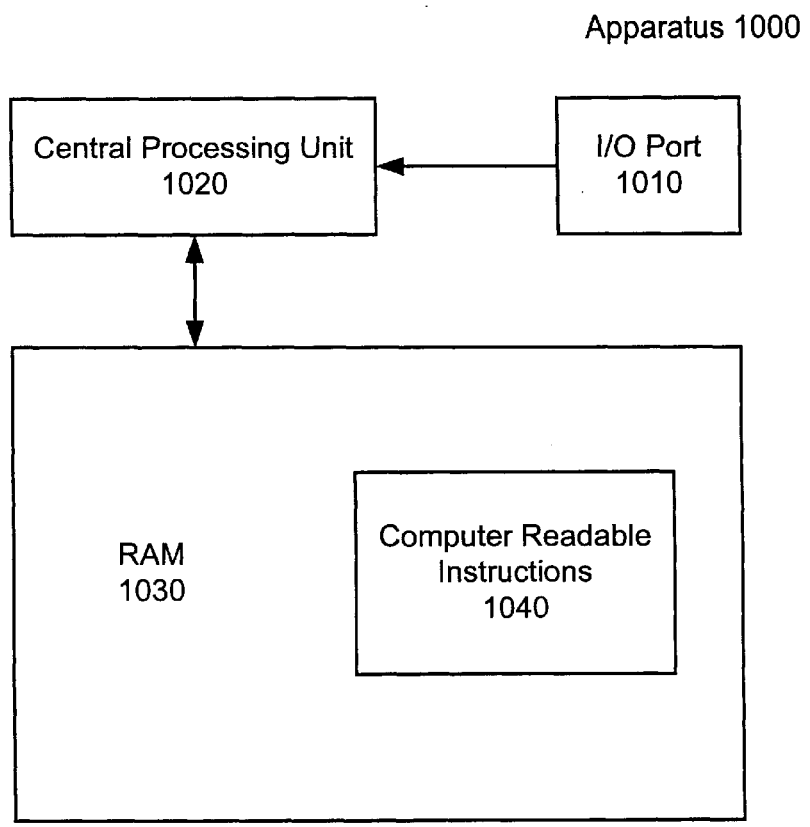
FIG. 1 is a block diagram illustrating a preferred apparatus embodiment of the present invention, the apparatus also being the environment in which the methods of the present invention can be implemented.

FIG. 1 is a block diagram illustrating the preferred computer apparatus 1000 for carrying out the present invention. As shown, the apparatus 1000 consists of an input/output (or I/O) port 1010, a central processing unit (or CPU) 1020 and a random access memory (or RAM) 1030 containing one or more novel computer programs 1040 executable on the CPU. The I/O port may be coupled to one or more user interface devices such as a document scanner, a video monitor or a printer. Alternatively, it may be coupled to a modem, network interface card or another of the many well known devices for transmitting digital data over a computer network. Other apparatus for carrying out the invention are also possible and will readily occur to those of ordinary skill in the art based on this disclosure. For example, the computer program 1040 of FIG. 1 can encompass a wide number of variations as described in greater detail below. Moreover, while the preferred embodiments of the present invention are primarily described in terms of a computer program which can be executed by a CPU, alternative embodiments of the invention employing combinations of software, firmware and/or hardware modules are also possible. Such other embodiments may include instances in which one or more computer programs are etched into a read only memory or performed in hardware by a dedicated integrated circuit or network of circuits.

Figure 2:
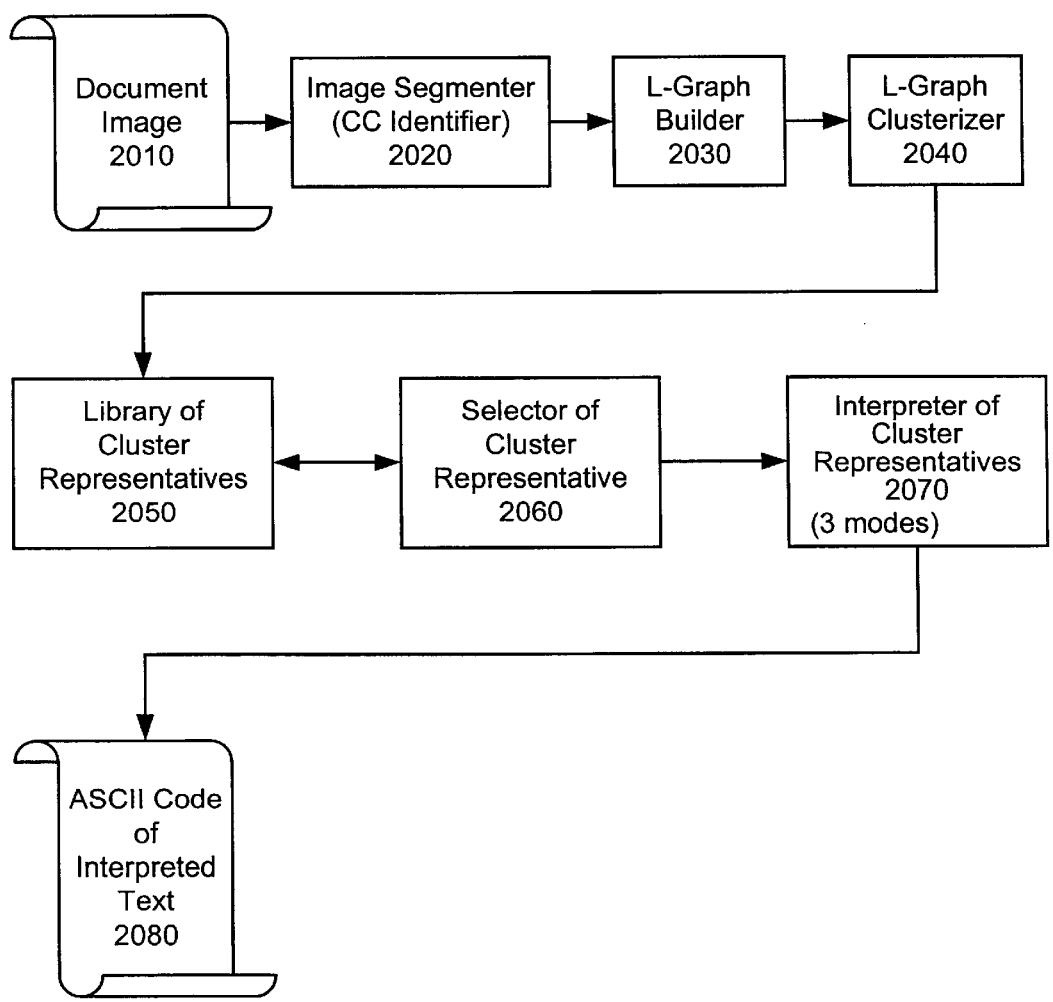
FIG. 2 is a block diagram illustrating preferred hardware, firmware and/or software modules to carry out various method features of the present invention.

FIG. 2 is a block diagram illustrating one preferred embodiment of hardware, firmware and/or software modules for carrying out the present invention. As shown therein, a document image 2010 is received by an image segmenter module 2020 which identifies all of the connected component objects contained within the document image and preferably stores each connected component object as a linked list of pixel runs of a given binary value. As is known in the art, the image segmenter 2020 then creates a list of all of the identified connected component objects and outputs that list for further processing.

In accordance with the present invention, the list of connected components is received by an L-graph builder module 2030 which generally determines the connectivity relationships between the pixel runs in each of the connected component objects identified by image segmenter module 2020. L-graph builder module 2030 then preferably records such data in a novel data structure which reflects the simplified L-graph representation of each connected component object as described in greater detail below.

Once L-graph builder 2030 has generated L-graph representations of each connected component object from the document image 2010, the resulting data is preferably passed to an L-graph clusterizer module 2040. Clusterizer module 2040 then organizes the set of all L-graph representations into clusters of similar L-graphs. Each cluster is obtained by comparing feature vectors of the L-graphs to thereby calculate the distance between each of the connected components objects. Once this is accomplished, objects meeting a minimum degree of similarity are grouped into clusters. An L-graph representation which is most representative of the L-graphs of each cluster is then selected for use as the cluster representative and this information is sent to a library 2050 where the cluster representatives are stored for future use.

As shown in FIG. 2, an object selector module 2060 can retrieve cluster representatives from module 2050 and feed them to an interpreter module 2070. Interpreter module 2070 then compares each of the cluster representatives with known objects stored in a reference dictionary of known objects. Preferably, this comparison, or interpretation, can occur either automatically, semi-automatically, or manually as dictated by the user. When a given cluster representative and one of the dictionary objects are sufficiently similar, interpreter module 2070 recognizes the cluster representative as a known object. The present invention will subsequently utilize a simplified representation of the known object (preferably an ASCII code) from the dictionary in place of the cluster representative. It will also use the simplified representation in place of any of the other members of the cluster associated with the cluster representative. Conversely, when the compared objects are sufficiently dissimilar, interpreter module 2070 can update the dictionary by adding the cluster representative to the dictionary of known objects for future recognition purposes. Preferably, this entails manual recognition of the object under consideration. Outputting recognized objects in the manner discussed above results in the output of interpreted text 2080 as shown in FIG. 2.

A more detailed discussion of each of the modules depicted in FIG. 2 follows. While the discussion below describes one preferred embodiment of the present invention, those of ordinary skill will readily appreciate that variants of this embodiment are also possible. For example, clusterization and interpretation of cluster representatives could be eliminated and the L-graphs of the targeted objects could be compared directly with the known objects in the reference dictionary. This simplified variation has the advantage of being fast and simple to implement. By contrast, clusterization offers the advantage of being more flexible and more accurate. These advantages are achieved because one or more of the clusters can be modified over time to take into account the lessons learned during interpretation operations. Still other advantages of this embodiment are discussed below.

In the preferred embodiment, image segmentor module 2020 is a conventional component which reads a scanned document or image row-by-row and classifies each pixel run of a given binary value found within a row (e.g., a contiguous run of black pixels) by determining its connectivity to pixel runs of the same binary value in the immediately vertically preceding row. For a given pixel run, segmenter module 2020 can determine whether each run is (1) not connected to a pixel run of the preceding row; (2) connected to a single pixel run of the preceding row; or (3) connected to a plurality of pixel runs in the preceding row. Upon processing all of the rows of pixels in a document image, image segmenter module 2020 has identified each connected component object within the image and recorded pixel data for each of these connected component objects. This data is then passed to the L-graph builder 2030 for additional processing. Image segmenters are well known in the art and those of ordinary skill will understand how to utilize these conventional segmenters in the context of the present invention.

Figure 3A:
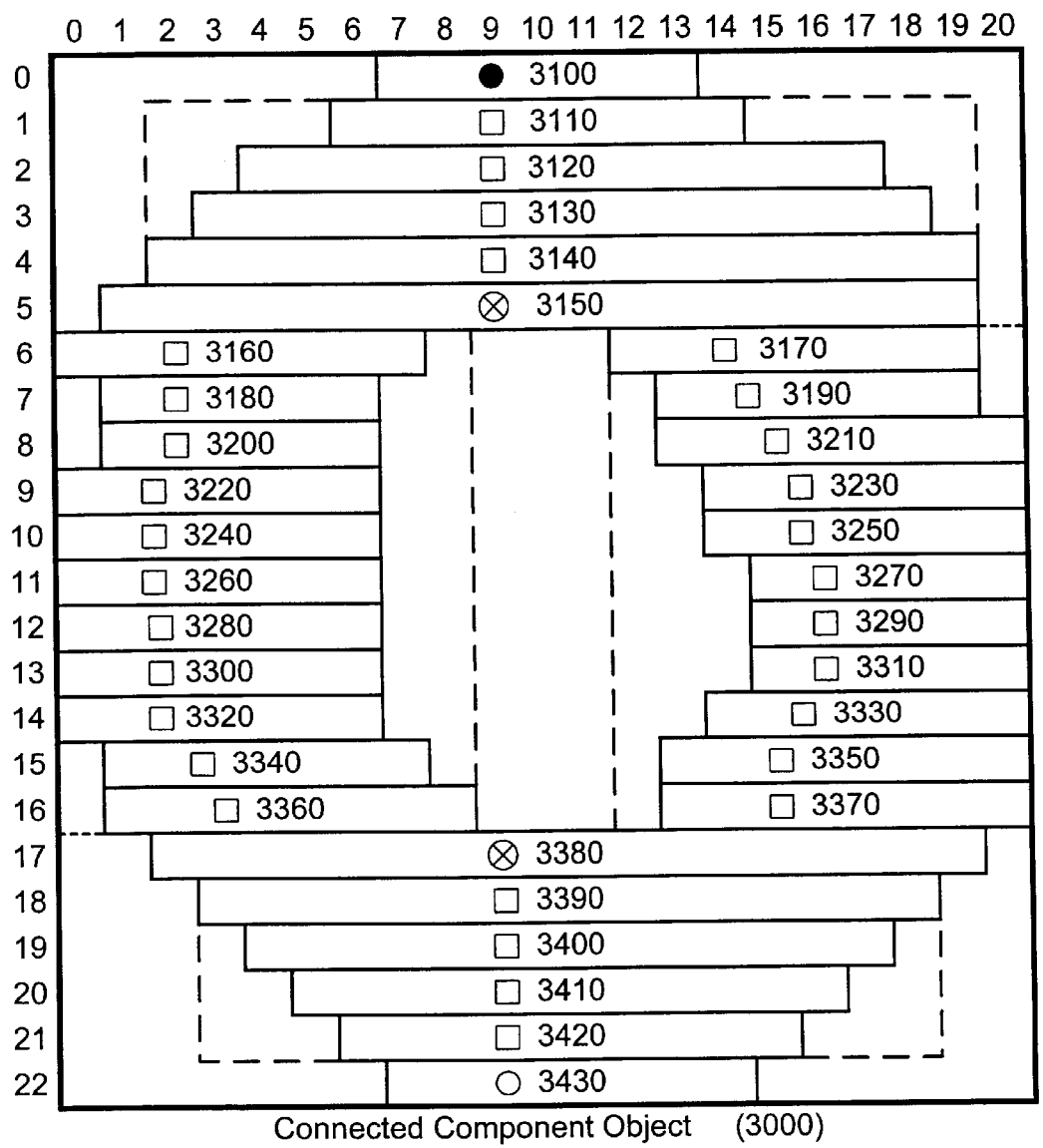
FIG. 3a is a representative connected component object of a bi-level image with the results of one preferred nodal analysis being superimposed upon the pixel runs comprising the object.

One example of a connected component object comprising a plurality of pixel runs arranged in a plurality of parallel pixel rows is illustrated in FIG. 3a. As shown therein, connected component object 3000 includes pixel runs 3100 through 3430 contained in pixel rows 0 through 22. Connected component object 3000 is the letter "O" and, in this case, the minimal bounding rectangle for the entire object 3000 is 21 pixels wide by 23 pixel rows tall. For simplicity, object 3000 has been shown in a vertical/horizontal orientation and the analysis of this object is shown and described herein as being performed vertically from the top and to the bottom row. These directions are intuitively understood relative to the edges of a document. Those of ordinary skill, however, will readily appreciate that objects could occur with virtually any orientation and such objects can also be readily interpreted using the invention. Thus, as used herein the terms horizontal, vertical and their various conjunctives should be read broadly to cover any object orientation.

It will also be appreciated that while object 3000 is shown as a letter of the English language, connected component objects could be virtually any character of any language. Additionally, such objects could be any symbol (e.g., mathematical, typographical, monetary, linguistic, gramatic, etc.) meeting the definition of connected component as set forth herein. Therefore, a connected component object could be any graphic image (including logos and pictures) of a single level of a bi-level image that is completely surrounded by pixels of the opposite level of a bi-level image or document.

Figure 3B:
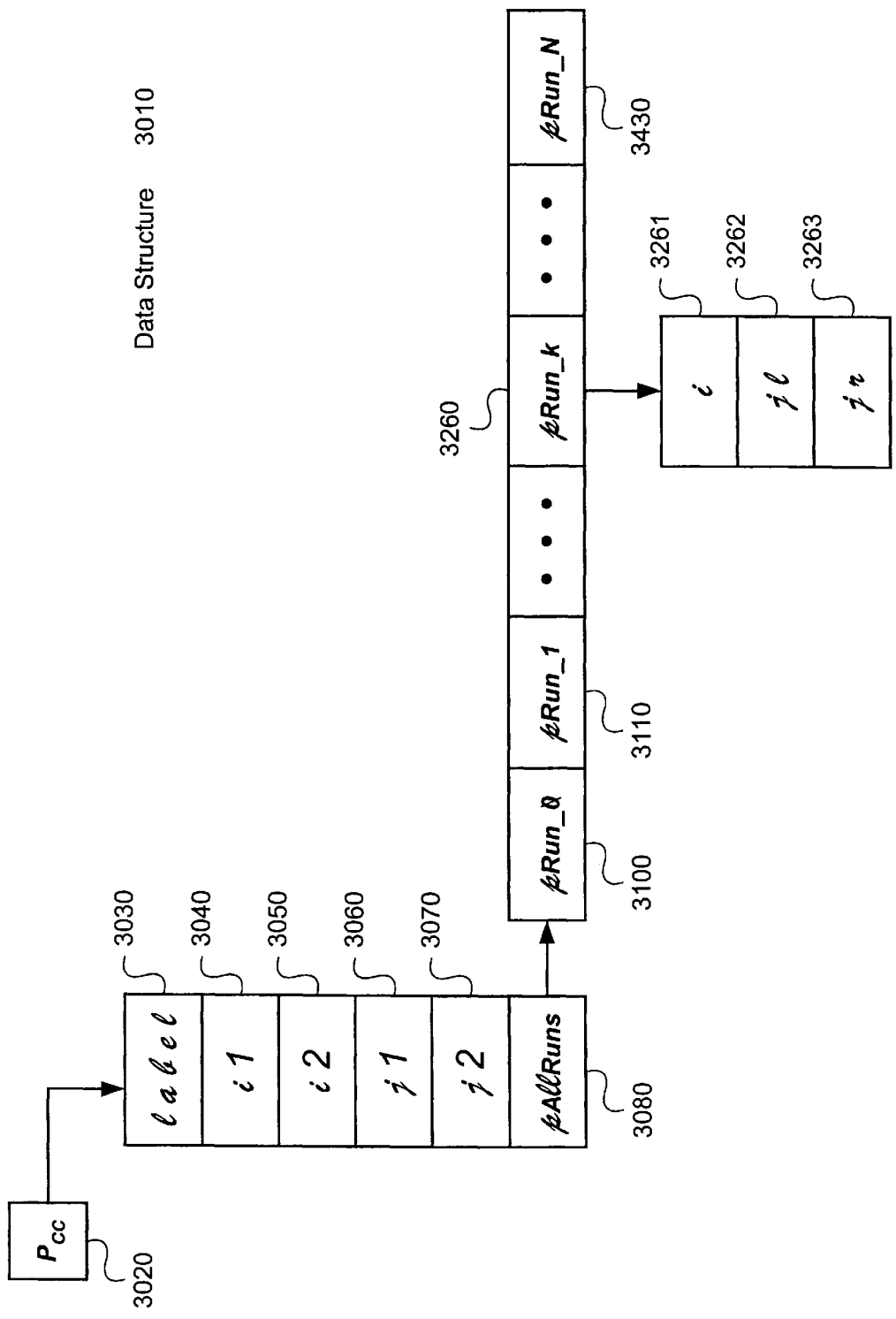
FIG. 3b illustrates a basic data structure for characterizing connected component objects such as that of FIG.

During segmentation, image segmenter module 2020 analyzes the pixel runs of each object (see, for example, the pixel runs of FIG. 3a) and uses the resulting data to populate a basic data structure such as data structure 3010 shown in FIG. 3b. As shown therein, the data structure 3010 for each connected component object includes a pointer 3020 which points to a feature vector having 6 fields. The first field, field 3030, includes a label for the connected component object which identifies the connected component to facilitate search and retrieval of the associated data.

Fields 3040 through 3070 define the minimal bounding rectangle for the targeted object. In particular, fields 3040 and 3050 are used to store the addresses of the left-most column and right-most column, respectively, for the minimal bounding rectangle surrounding the targeted object. Similarly, fields 3060 and 3070 are used to store the addresses of the upper-most and lower-most rows, respectively, for that minimal bounding rectangle.

A final vector field 3080 includes a pointer to an array of vectors 3100 through 3430. These vectors define each of the pixel runs for the targeted connected component object. As shown in FIG. 3b, the pixel runs are preferably stored as a linked list of pixel runs. However, those of ordinary skill will recognize that other data structures are also adequate to capture this information. One such example is an array the size of which varies with each insertion/deletion. A representative pixel run vector 3260 is shown to have three fields. While field 3261 stores the row number for the pixel run, fields 3262 and 3263 store the left-most and right-most column addresses for the pixel run represented by vector 3260. Naturally, each pixel run vector in the array includes analogous information to define the remaining runs of the targeted object.

One significant drawback of utilizing data structure 3010 of FIG. 3b is that it does not capture information reflecting relationships between the various pixel runs forming each connected component object. Restated, the data structure of FIG. 3b is essentially a catalog of pixel runs for each object. As discussed below, one aspect of the present invention is directed to using the data in the form of data structure 3010 to generate data of a more sophisticated structure so that pixel run connectivity data can be captured. Once the image segmenter generates pixel run data as discussed above, the data is passed to the L-graph builder 2030 and it is then used by the L-graph builder 2030 to generate L-graphs for each of the objects. This is described immediately below.

Figure 4A:
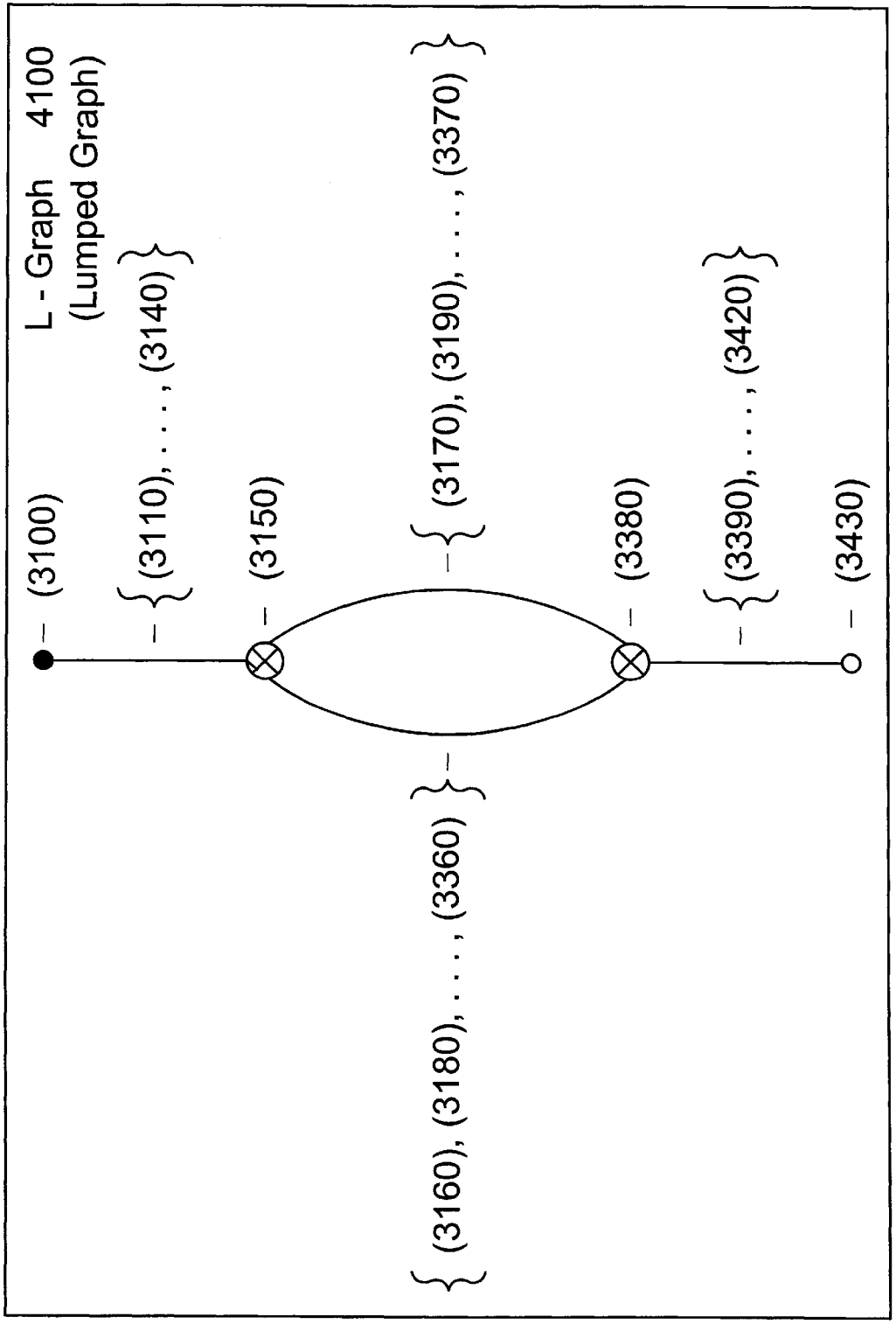
FIG. 4a is an L-graph representation of the connected component object shown in FIG. 3a, the L-graph being generated in accordance with one preferred system of nodal analysis.

An L-graph (i.e., lumped graph) representation of the representative object 3000 of FIG. 3a is shown in FIG. 4a.

For ease of reference, pixel runs associated with the L-graph and minimal bounding rectangles (see dotted lines) for each stroke or edge of the connected component object are shown in FIG. 3a. Corresponding pixel run numbers have also been included in FIG. 4a. The L-graph of FIG. 4a utilizes all of the four types of nodes preferably utilized by the present invention to represent any connected component object in L-graph form.

The preferred method of generating L-graphs entails analyzing the pixel runs of a targeted object beginning with the upper pixel row and proceeding vertically downward. The first of the four types of nodes used in the preferred system of nodal analysis is the beginning node. A beginning node is defined as a pixel run which does not have any pixel runs in the row of pixels which is adjacent and above the targeted pixel run. Node 3100 of FIG. 4a is an example of a beginning node. A second type of node is a stroke node. A stroke node is defined as a pixel run which has exactly one vertically aligned run in the adjacent row above the targeted run and one vertically aligned run in the adjacent row below the targeted pixel run. Pixel runs 3110 through 3140 are examples of stroke nodes (collectively referred to as a stroke or edge). A third type of node is a hinge node. A hinge node is defined as a pixel run that has at least three vertically aligned runs in two adjacent pixel rows (e.g., one in the row above and two in the row below, or vice versa). Node 3150 of FIG. 4a is an example of a hinge node because pixel run 3140 lies immediately above node 5150 and nodes 3360 and 3370 lie immediately below node 5150. A final node type is the end node. An end node is one in which there are no runs in the row adjacent and below the pixel run of the node. An example of an end node is 3430 of FIG. 4a. Together, these four types of nodes are the preferred node types utilized to generate L-graph representations of any connected component object.

L-graph 3100, which is the L-graph representation of object 3010 of FIG. 3a is shown in FIG. 4a. Applying the definitions for beginning, stroke, hinge and end nodes to the pixel run data shown in FIG. 3a and replacing adjacent stroke nodes with strokes result in generation of the L-graph of FIG. 4a. While L-graph 3100 is an accurate, abbreviated and intuitive representation of object 3010, a data structure corresponding to L-graph 3100 is desirable for computer-based manipulation of that data.

Figure 4B:
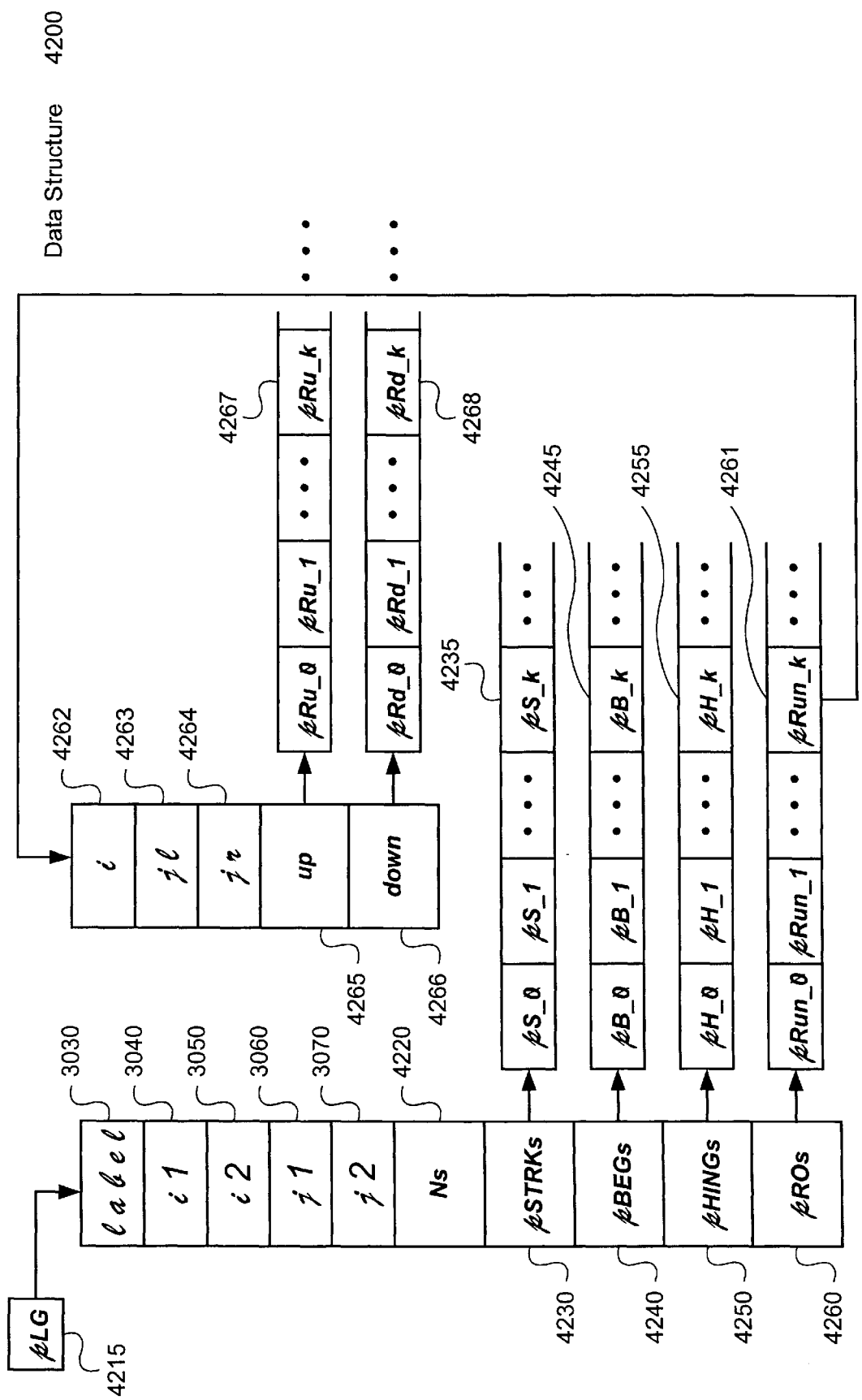

FIG. 4b shows a preferred data structure 4200 for capturing the characteristic topographical features illustrated in L-graph 3100. As shown in FIG. 4b, the data structure 4200 includes a pointer 4215 directed to a ten-field topographical feature vector, the first five fields of which are preferably identical to the first five fields of the data structure 3010 shown in FIG. 3b. Accordingly, these fields can be readily populated with the data passed from the image segmenter. The remaining data fields of the topographical feature vector, however, are preferably generated from the pixel run data in the pixel run array (vectors 3100 through 3430 of FIG. 3b) generated by the image segmenter. While the procedure for populating the remainder of the data structure 4200 will be discussed below, the remainder of the data structure itself will be addressed here.

With continuing reference to FIG. 4b, data field 4220 is a simple numerical field which contains the number of strokes (or edges) determined to be in the targeted connected component object. By contrast, fields 4230 through 4260 contain pointers to respective topographical feature vector arrays. Field 4230 references a vector array comprising none, one or more six-parameter vectors (see data structure 5600 of FIG. 5c). Each of the vectors in the arrays referenced by fields 4240 and 4250 include row and column data for a given pixel run directly analogous to vector 3260 (having fields 3261 through 3263) of FIG. 3b. As shown, vectors 4245 and 4255 are representative vectors for the feature vectors arrays 4240 and 4250 respectively.

While the data in the vector array of field 4230 is preferably generated from the data contained in the vector array of field 4260, the data in the vector arrays of fields 4240 and 4250 is a subset of the data contained in the vector array of field 4260. In particular, FIG. 4b illustrates that field 4260 is a pointer to a vector array having a representative vector 4261. As shown, each entry of this array is a five-field vector 4262–4266 wherein the first three fields 4262–4264 includes row and column data for each pixel run of the nature discussed above. Additionally, each of these vectors includes an "up" field 4265 and a "down" field 4266. Each of these fields includes a pointer to yet another vector array of none, one or more three-parameter vectors with representative vectors 4267 and 4268, respectively. These up and down fields include pixel run data about runs aligned with and adjacent to (above and below) the targeted pixel run. Accordingly, the data in these up and down fields can be used to determine whether a particular pixel run is a stroke node, a beginning node, a hinge node or an end node. The data in the vector array of field 4260 is, therefore, comprehensive and can be utilized to directly populate the beginning and hinge node arrays 4240–4250. In so populating these arrays, the up and down field data becomes unnecessary and is preferably not included in the vector arrays of fields 4240 through 4250. Nonetheless, there is duplication of data between fields 4230 through 4260. While such duplication of data is not necessary for the operation of the invention, it has been empirically proven to be advantageous in conducting the calculations discussed below. Accordingly, alternative embodiments of the present invention can utilize a data structure similar to data the structure 4200, except that any one or more of fields 4220 through 4250 are entirely omitted. Finally, the data in the array of field 4260 can also be utilized to calculate the number of strokes in the targeted object so that this data can be included in field 4220.

Figure 5A:
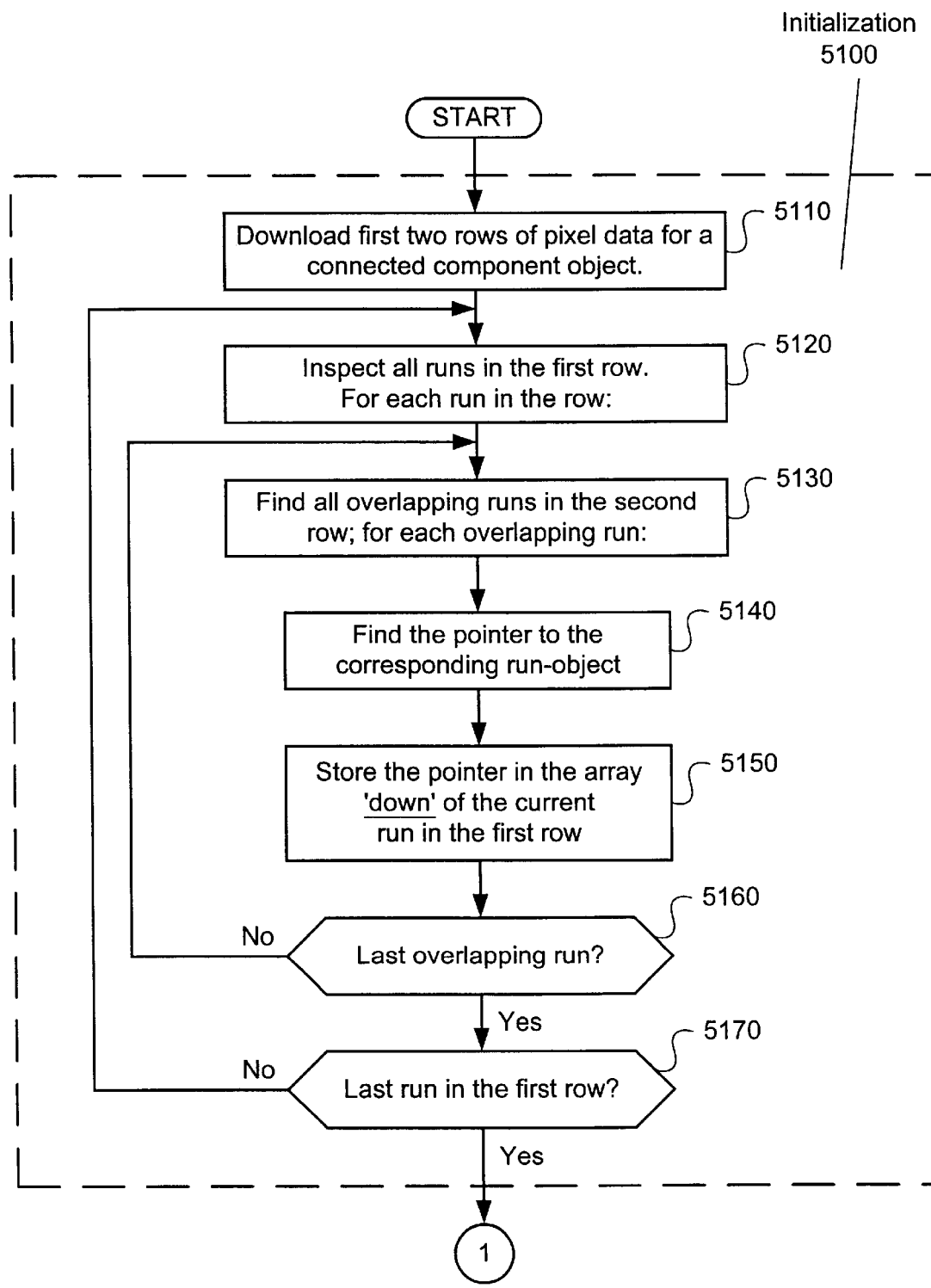
FIGS. 5a–5a''' represent one preferred procedure for generating L-graph data for connected components objects, the procedure being used to populate selected portions of the data structure of FIG. 4b.

With joint reference now to FIGS. 5a through 5a''', one preferred procedure for populating the data structures with pointers in the array 4260 (see FIG. 4b) will now be described. Once again, it is to be noted that this process generally entails generation of data for none, one or more five-field vectors (fields 4262 through 4266 of FIG. 4b) from data originally comprising three fields (fields 3261 through 3263 of FIG. 3b). The first part of the procedure for populating the data structure of an L-graph is referred to as initialization 5100 and is depicted in FIG. 5a. Initialization commences, when data with a structure like that shown in FIG. 3b is passed from the image segmenter 2020 to L-graph builder 2030 (see FIG. 2). When this happens, the first two rows of pixel data for a connected component object are downloaded at step 5110 for analysis. The following step 5120 entails inspecting all of the runs in the first row and for each of these runs performing steps 5130 through 5160. Steps 5130 through 5160 entail (1) finding all vertically aligned runs in the adjacent lower row and for each aligned run; (2) finding the pointers to the corresponding aligned runs; (3) storing these pointers in the "down" array of the current run in the current row; and (4) determining if the final aligned run in the adjacent lower row has been considered. If there are any more aligned runs in the lower row steps 5130 through 5160 are repeated until there are no more such runs for the current run of the current row. Then, step 5170 is executed to determine if the final run of the current row has been considered. If not, steps 5120 through 5170 are re-executed until all of the runs in the current row have been considered. Once the final run in the current row has been fully analyzed, the process passes through jump bubble 1 to an iteration stage 5200 as shown in FIGS. 5a' and 5a''.

With joint reference now to FIGS. 5a' and 5a'' iteration 5200 commences at jump bubble 1 with step the 5245 of inspecting all runs in the current row of the connected component object (during the first iteration this will be the second row of the image). For each run in that row steps 5250 through 5270 will be executed. In particular, for each run in the row each vertically aligned run in the preceding row must be found 5250 and for each such overlapping run steps 5255 through 5265 will be executed. This entails (1) finding the pointer corresponding to the aligned run; (2) storing 5260 the pointer in the "up" array of the current run in the current row; and (3) determining if the last aligned run has been analyzed 5265. If not, steps 5250 through 5265 must be re-executed until the last aligned row has been analyzed; at which point steps 5245 through 5270 are re-executed until the last run in the current row has been analyzed. When this happens, iteration process 5200 passes through step 5275 where the next row of the connected component object will be downloaded and the process will continue.

With primary reference now to FIG. 5a''', process 5200 continues through jump bubble 2 after the next row of data has been downloaded. At this point, all runs of the current row of the connected component are inspected 5205. For each run in the current row, steps 5210 through 5225 will be executed. In particular, for each run in the current row, each vertically aligned run in the row adjacent and below the current row will be found in step 5210 and for each such run steps 5215 through 52325 will be executed. This entails (1) finding the pointer corresponding to each vertically aligned run in the row adjacent and below the current row; (2) storing the pointer in the "down" array of the current run in the current row; and (3) determining if the final aligned run of the row adjacent and below the current row has been analyzed. If the final aligned row has not been analyzed, steps 5210 through 5225 must be re-executed until there are no more such runs to analyze; at which point the process passes to step 5230 where it is determined whether the final run in the current row has been analyzed. If not, steps 5205 through 5230 are re-executed until the final run in the current row has been analyzed.

The process continues at step 5235 where the next row of the connected component object is re-named as the current row. Then, step 5240 is executed where it is determined whether the final row of the connected component object has been downloaded. If not, the process passes to the beginning of iteration stage 5200 through jump bubble 1 and repeats until the final row of the connected component object has been downloaded. When this happens, the process passes to a termination phase 5300 through jump bubble 3 (see FIG. 5a'''). Upon reaching the termination phase 5300, the process passes to step 5310 where all runs in the final row of the connected component object are inspected. For each run in the final row, steps 5320 through 5350 are executed. In particular, all vertically aligned runs in the adjacent and above row must be found and for each such run steps 5330 through 5350 must be executed. This entails; (1) finding the pointer corresponding to each vertically aligned run in the preceding row; (2) storing the pointer in the "up" array of the current run in the final row; and (3) determining if the final aligned run of the preceding row has been analyzed. If this final run has not been analyzed, steps 5320 through 5350 are repeated until the final aligned run has been analyzed; at which point the process passes to step 5360. At step 5360 it is determined whether the final run in the final row has been analyzed. If not, steps 5310 through 5360 are repeated until the final run in the final row has been analyzed and the process ends.

Figure 5B:
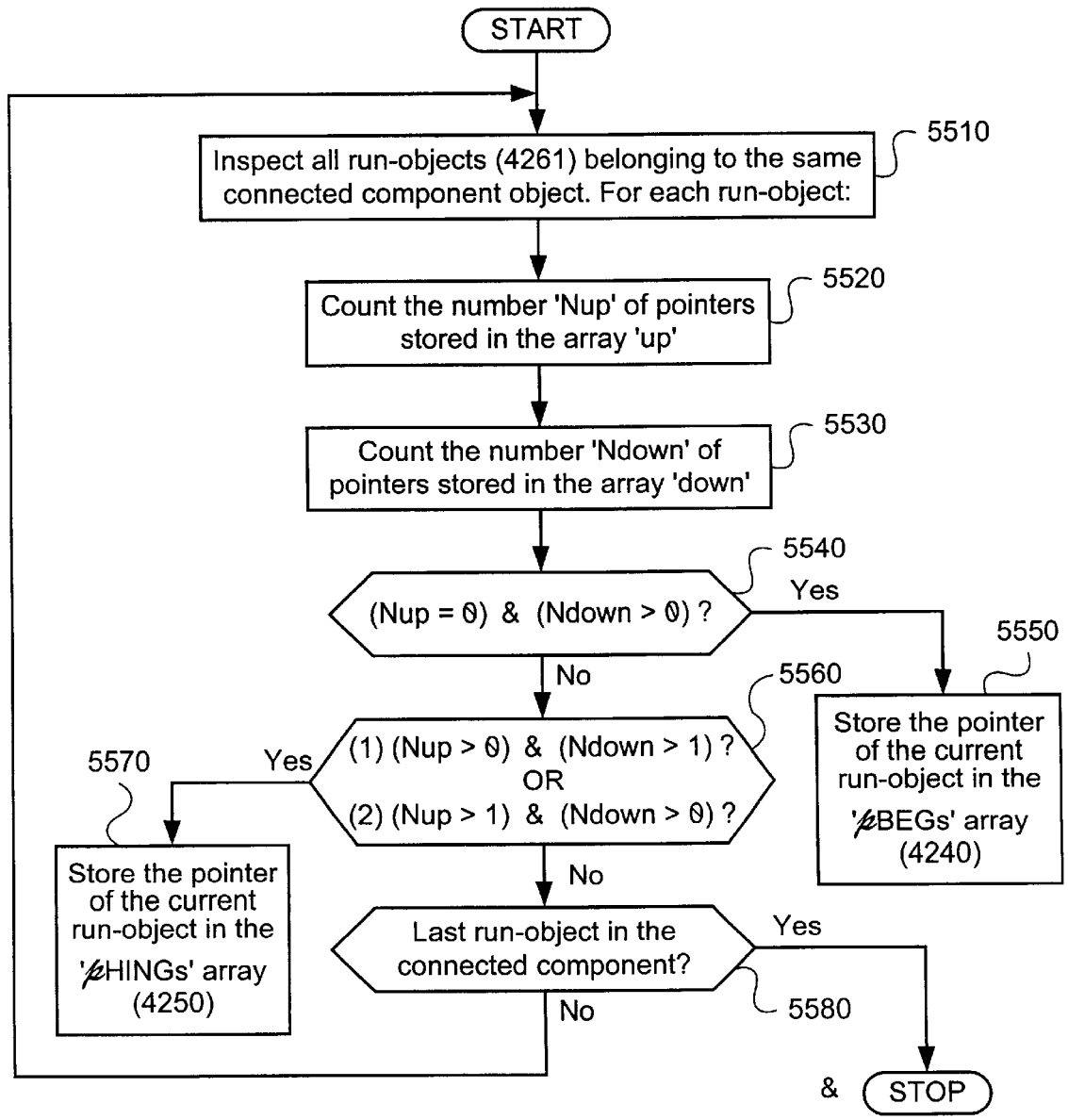
FIG. 5b represents one preferred procedure for further processing the data populating the data structure of FIG. 4b.

Once the array of data structures of field 4260 has been populated, the present invention can utilize that information to populate the remaining fields in the data structure 4200. For example, FIG. 5b illustrates a preferred procedure for populating the beginning node array of field 4240 and the hinge array of field 4250 based on the data of the array of field 4260 (see FIG. 4b). Once data structure 4200 has been entirely populated, all of the connectivity relationships between the various nodes have been determined and all of the characteristic topographical feature vectors of the object have been specified.

With primary reference now to FIG. 5b, a procedure 5500 for identifying pixel data which corresponds to beginning and hinge nodes of L-graphs is shown therein. When procedure 5500 commences, all data of field 4160 belonging to the same connected component object is inspected at step 5510. For each run in the object steps 5520 through 5580 are executed. In particular, for each pixel run, the number of pointers stored in the array "up" are counted at step 5520. Then, the number of pointers stored in the array "down" are counted at step 5530. In step 5540, it is determined whether the number of "up" pointers equals zero and whether the number of "down" pointers is at least 1. If so, the current pixel run must be a beginning node and its pointer is stored at step 5550 in the beginning node array of field 4240 (see FIG. 4b). Otherwise, it is determined whether there is at least one "up" pointer and at least two "down" pointers. If so, the pixel run must correspond to a hinge node and the pointer for the pixel run vector is stored at step 5570 in the hinge array of vector 4250 (see FIG. 4b).

Additionally, step 5570 is also executed if there are at least two "up" pointers and at least one "down" pointer.

Procedure for 5500 then passes to step 5580 where is determined whether the final pixel run in the connected component object has been analyzed. If not, steps 5510 through 5580 are repeated. If the last run in the connected component object has been analyzed, the procedure simply terminates. At this point, the beginning node array of field 4240 and the hinge node array of field 4250 of FIG. 4b will be populated.

It will be appreciated that the invention preferably analyzes connected component objects from top to bottom. One simple alternative is to analyze objects from bottom to top. If this is desired obvious variations of the invention are all that need occur. For example, end nodes would be substituted for beginning nodes and certain location counters should be set to some value and decremented (instead of incremented) appropriately.

Figure 5C:
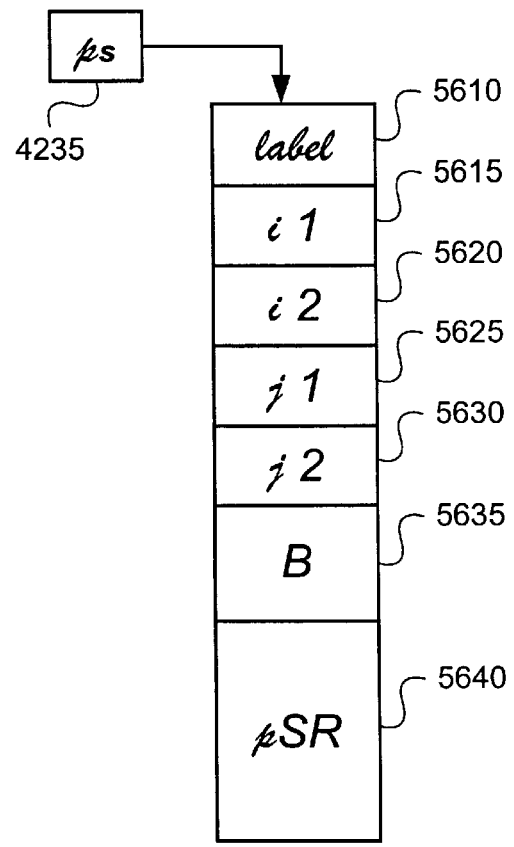
FIG. 5c illustrates one preferred data structure for capturing stroke or edge data of the present invention.

The preferred data structure 5600 for each of the strokes or edges in the stroke array 4230 (see FIG. 4b) is illustrated in FIG. 5c. As shown therein, each stroke array entry includes a pointer 4235 to a vector of seven fields. The first field 5610 is merely a label for the stroke. Fields 5615 through 5630 represent the minimal bounding rectangle for the stroke wherein $i_1$ and $i_2$ define the uppermost and lowermost rows of the stroke and wherein $j_1$ and $j_2$ represent the first and last columns of the stroke. For example, in the case of the object shown in FIG. 3a, the minimal bounding rectangle covering runs 3110 through 3140 are defined by $i_1=1$; $i_2=4$; $j_1=2$; and $j_2=19$. Field 5635 of data structure 5600 includes a filling-factor value indicative of the number of pixels in the minimal bounding rectangle of the stroke which are of one particular color. In a preferred embodiment, field 5635 indicates the number of black pixels within the minimal bounding rectangle defined by fields 5615 through 5630.

The final field of data structure 5600 is field 5640. This field represents a pointer to an array of pointers 4261 in FIG. 4b which in turn references data for each of the runs within the stroke. Each of the run data within the array indicates the row number and leftmost and rightmost column numbers for each pixel run in the array, as well as "up" and "down" pointers to the data of overlapping runs in adjacent rows.

Figure 5D:
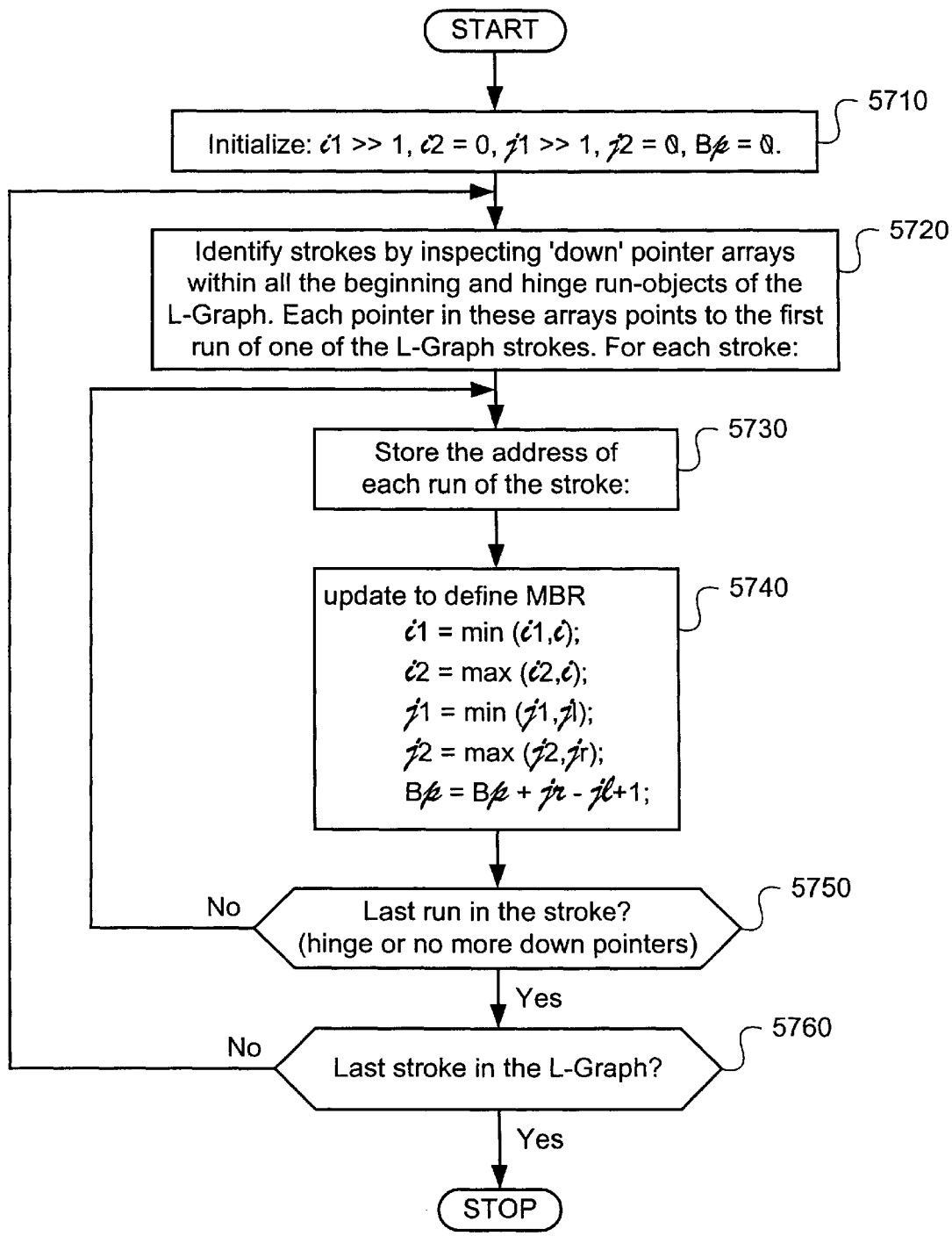
FIG. 5d illustrates one preferred procedure for generating stroke data of the present invention, this data being used to populate the data structure of FIG. 5c.

The procedure for populating data structure 5600 of FIG. 5c is shown as procedure 5700 of FIG. 5d. As shown in that figure, the preferred procedure 5700 for populating data structure 5600 entails processing the data in the array of field 4260 (see FIG. 4b). Procedure 5700 commences with an initialization stage 5710 where the values of the minimal bounding rectangle and number of darkened pixels are initialized. In step 5720 each of the strokes (or edges) in the connected component object can be identified by inspecting the "down" pointer arrays within all of the beginning and hinge run objects of the L-graph. For each stroke (or edge) thus identified, steps 5730 through 5750 are executed. This entails (1) storing the address of each run (i.e., stroke node) of the stroke; (2) updating the minimal bounding rectangle data to expand the boundaries for each run added to the stroke; (3) increasing the number of darkened pixels by the number of pixels in each added run; and (4) determining whether the final run in the stroke has been analyzed. If not, steps 5730 through 5750 are repeated until the final run (or node) in the stroke has been analyzed. Then, it is determined whether the final stroke in the L-graph has been generated. If not, steps 5720 through 5760 are repeated until the final stroke (or edge) in the L-graph has been analyzed. When this happens, data structure 5600 is complete and procedure 5700 terminates. It will readily be appreciated by those of ordinary skill in the art that the number of time steps 5720 through 5760 are repeated equals the number of strokes in the L-graph. Accordingly, field 4220 of FIG. 4b can be populated by counting the number of these rectangles and populating field 4220 with that value.

Once the data structure 4200 (see FIG. 4b) has been populated for each connected component object of the document image, L-graphs have been specified for each of those objects by L-graph builder 2030. As noted above, the present invention takes that data and transfers this information to the L-graph clusterizer 2040 (see FIG. 2). Clusterizer 2040 then clusters the various L-graphs together based upon a mathematical analysis of their similarities.

Figure 6:
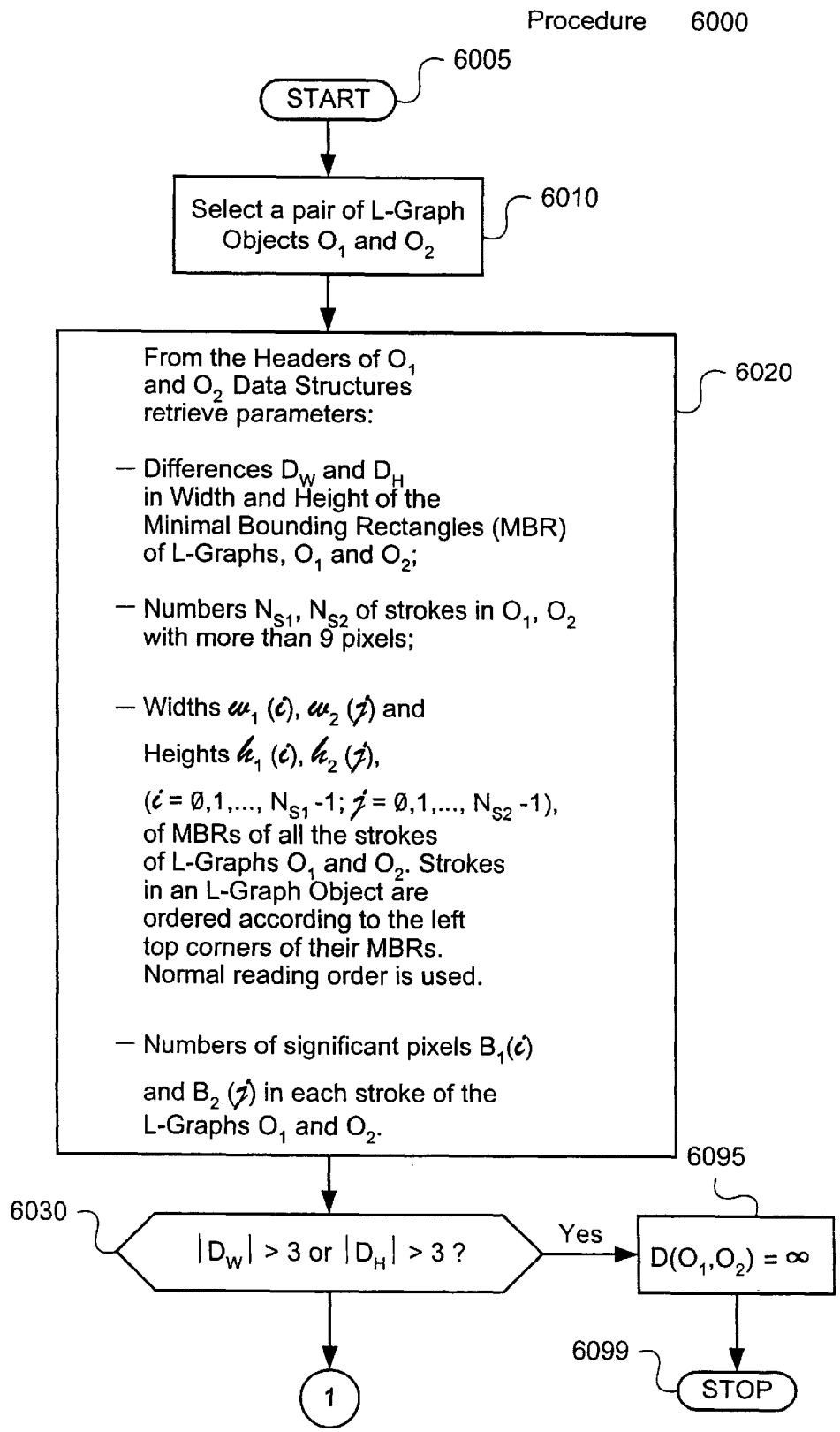
FIGS. 6—6'' illustrate one preferred procedure for comparing the topographical feature vectors of two connected component objects to thereby determine the distance between them.
Figure 6:
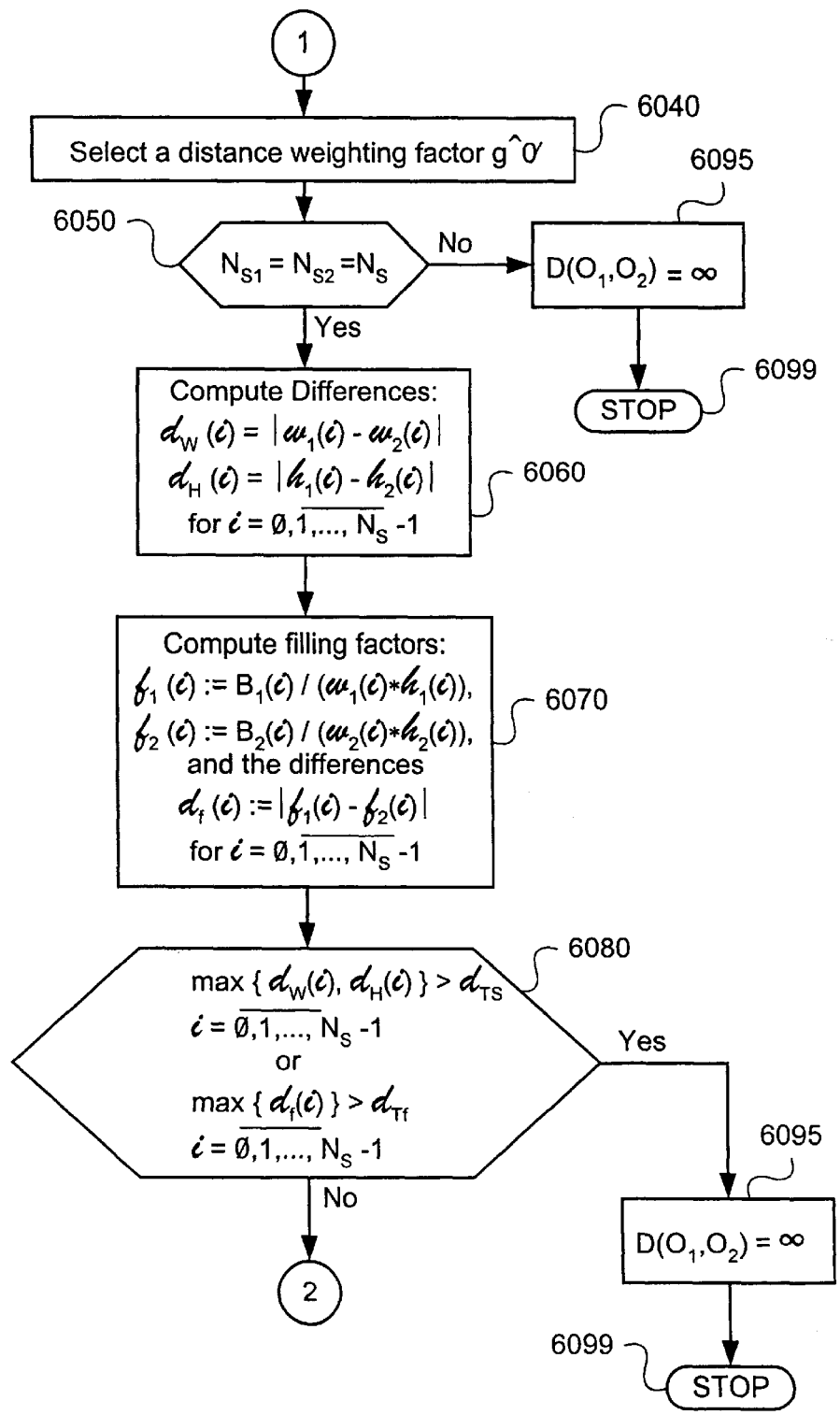

The procedure 6000 for comparing two L-graphs for the purpose of clustering similar objects is illustrated in FIGS. 6 through 6". As shown in FIG. 6, a procedure 6000 begins at step 6005 and immediately proceeds to steps 6010 where data stored in a pair of L-graph data structures (illustrated in FIG. 4(b)) is selected for analysis. This data represents feature vectors used by procedure 6000 to measure the similarity of the pair of objects, as illustrated in FIG. 6. The process then proceeds to step 6020 where various parameters are retrieved for each of the L-graphs to be compared. This data is then passed to step 6030 where the absolute value of the size difference between minimal bounding rectangles of the L-graphs are evaluated. In the preferred embodiment, if either the height or the width of the minimal bounding rectangles differs by more than 3 pixels (assuming 300 dpi resolution; other pixel distances can be specified), step 6095 dictates that these objects are too dissimilar to one another and the process terminates at step 6099. If, however, the minimal bounding rectangles of these L-graphs do not fail the test of step 6030, the process passes through jump bubble 1 to FIG. 6' where a distance weighing factor is selected at step 6040. In the preferred embodiment of the present invention, the distance weighing factor is about 0.2 or 0.3. This value has been empirically determined to improve the accuracy of similarity determinations by de-emphasizing the importance of filling factor differences and emphasizing importance of minimal bounding rectangle size differences. In operation, this weighing factor could be anywhere between zero and 1.

Next, at step 6050 it is determined whether the number of strokes in the two L-graphs is equal to one another. (For 300 dpi scanning resolution, strokes with less than 9 black pixels are disregarded. This number should be changed for different resolutions.) If not, the process passes to step 6095 where a mismatch is indicated and the process terminates at step 6099. If, however, the numbers of strokes in both L-graphs are equal, the process passes to step 6060 where size differences for the minimal bounding rectangles of the strokes are evaluated. Similarly, step 6070 entails computing filling factor differences for all of the strokes of the two L-graphs under consideration. Then, step 6080 is executed wherein it is determined whether the computed size differences and/or filling factor differences exceed respective threshold values. These threshold values are preferably $d_{Ts}=4.0$ and $d_{Tf}=0.5$ respectively, and have been empirically determined for scanning resolution of 300 dpi to maximize the efficiency and accuracy of the invention. Naturally, for different resolutions, other numerical values should be used, these values being between zero and one.

If the calculated differences do not exceed respective threshold values, the process passes to FIG. 6" through jump bubble 2. If they do, the process passes to step 6095 where a mismatch is indicated and the process terminates at step 6099. As shown in FIG. 6", difference values d1 and d2 are calculated at step 6090. Difference value d1 represents the sum of all of the width and height differences in the minimal bounding rectangles of the strokes. Similarly, value d2 represents the sum of all differences in filling factors for each of the strokes under consideration.

The total distance D between the two objects is then calculated to be the sum of values d1 and d2 wherein d2 has been weighted by an appropriate weighing factor, preferably 0.2. This weighing factor has been empirically determined for 300 dpi scanning resolution to improve the accuracy of similarity determinations. In operation, this weighing factor could ne anywhere between zero and 1 and it will be appreciated that within this range the weighing factor tends to de-emphasize filling factor differences and emphasize minimal bounding rectangle size differences. In any event, the total distance for the L-graphs under consideration are calculated at step 6090 and the process then terminates at step 6099.

After the procedure of FIGS. 6 through 6" has been performed for each pair of objects, the distance data for each pair of L-graphs can be utilized to cluster together objects which are sufficiently similar to one another. Whenever a mismatch has been indicated, clustering of those particular L-graphs will not occur. Clustering between two L-graph objects, however, will occur when the total distance value D is below a given threshold value. In the preferred embodiment of the present invention, the threshold value for this distance is $d_t=0.2 (D_{max}-D_{min})+D_{min}$. However, this value could be between about 0.1 $(D_{max}-D_{min})+D_{min}$ and 0.7 $(D_{max}-D_{min})+D_{min}$ where $D_{min}$ and $D_{max}$ are respectively minimal and maximal distances encountered.

Figure 7:
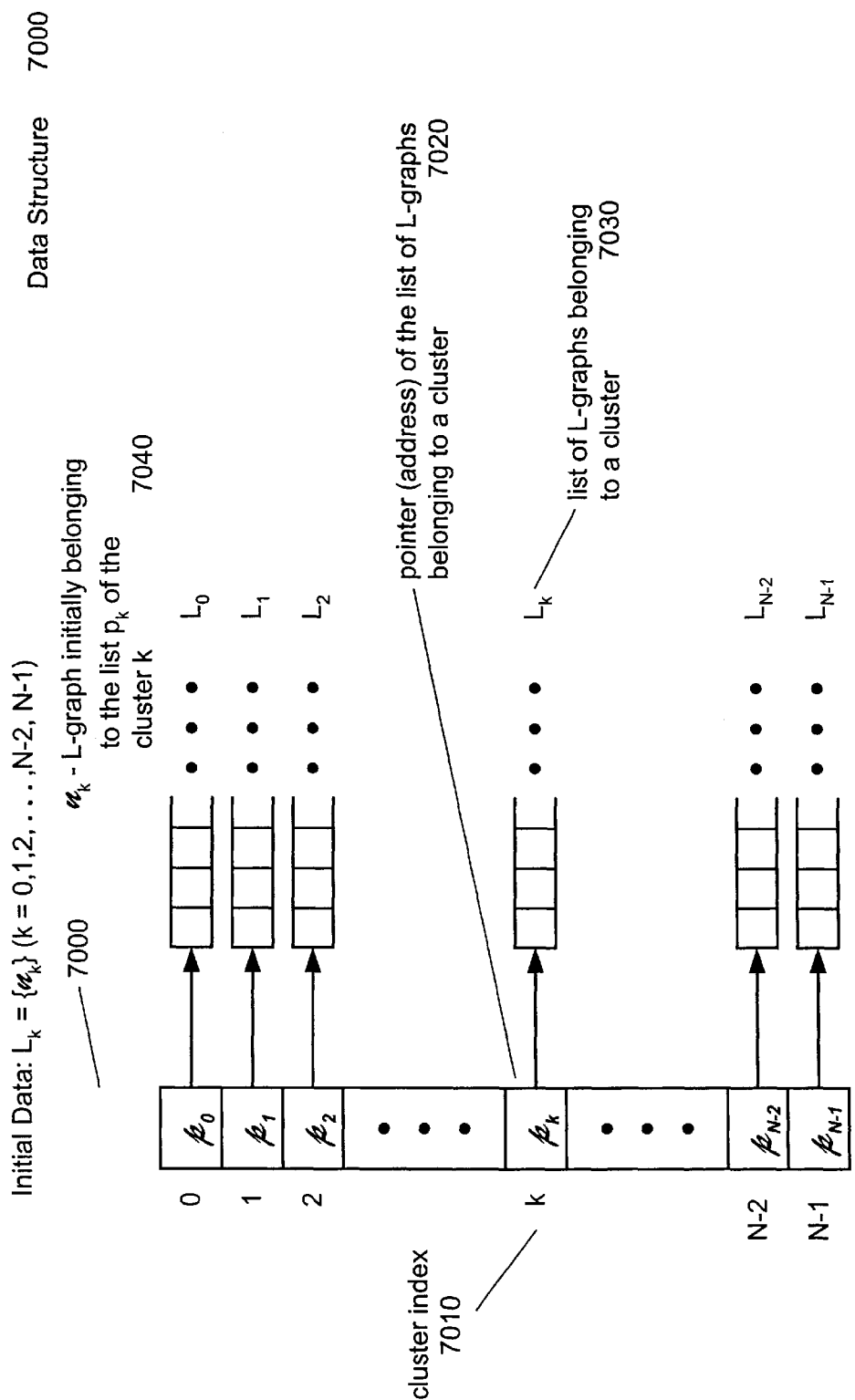
FIG. 7 illustrates one preferred data structure for storing clustered L-graph objects of the present invention.
Figure 8:
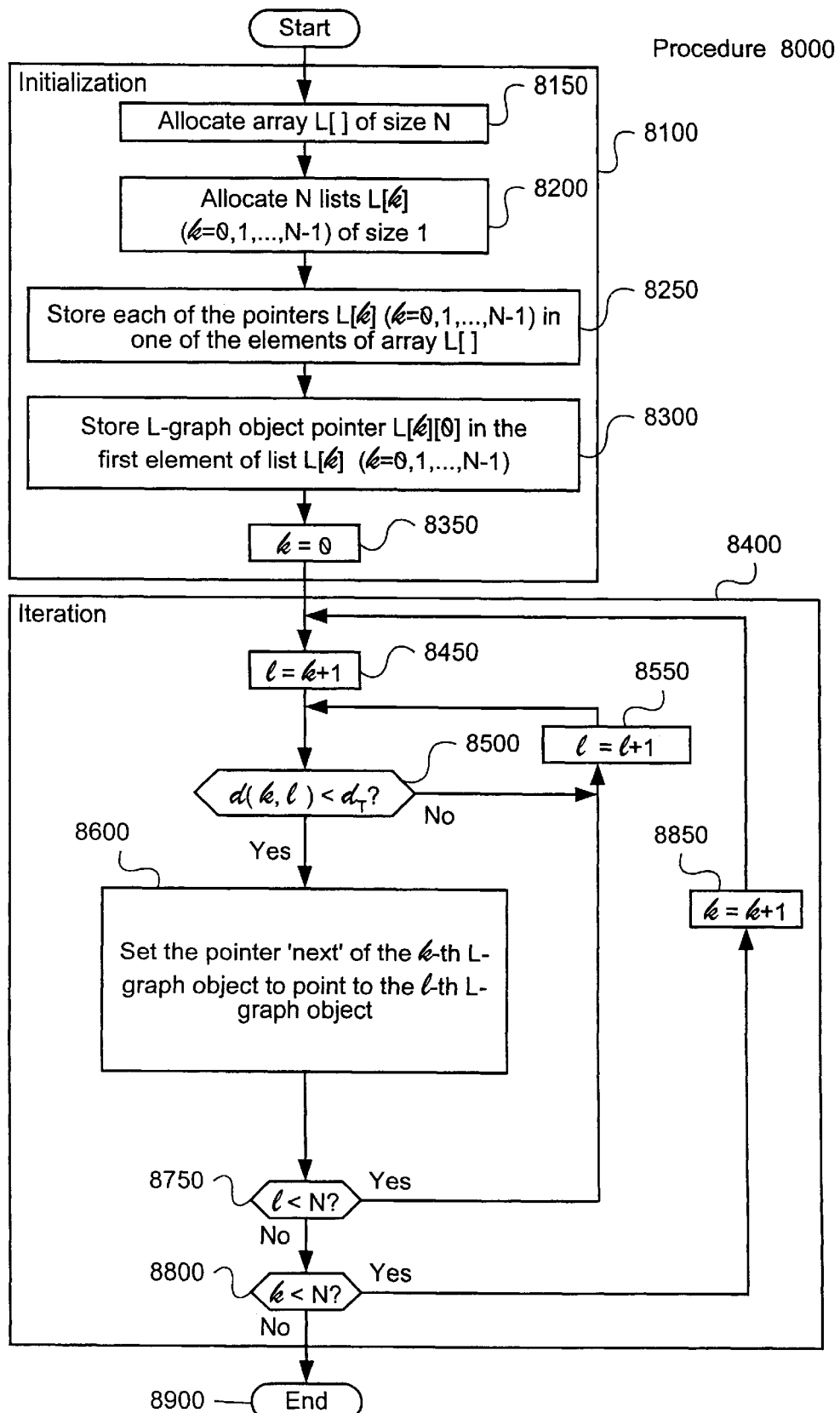
FIG. 8 illustrates one preferred procedure for clustering L-graph objects of the present invention, the resulting data being used to populate the data structure of FIG. 7.

The product of L-graph clusterizer 2040 is a plurality of L-graph clusters each containing a plurality of connected component objects which have been determined to be sufficiently similar to one another for clustering purposes. FIGS. 7 and 8 are directed to a data structure 7000 for organizing the clusters and a procedure 8000 for selecting the members of each cluster so that the data structure can be populated. As shown in FIGS. 7, a cluster index 7010, contains a vector of N pointers. Each of these pointers points to a cluster of connected component objects which have been clustered together.

It will be appreciated that, after the data structure of FIG. 7 is completed by the L-graph clusterizer 2040, all of the objects of a given document image will have been accounted for, either by inclusion in a given cluster or by exclusion from all clusters.

L-graph objects are preferably clustered according to the well-known method of nearest neighbor clustering (see, for example, T. Y. Young and T. W. Calvert, Classification, Estimation and Pattern Recognition, Elsevier, N.Y., 1974, pp. 143–145). However, other known clustering methods could be used. According to the nearest neighbor clustering procedure, the distance between two clusters is determined as the minimal distance between their respective elements. An element is considered to belong to a cluster it its distance from the nearest element of the cluster is below a certain threshold value.

The nearest neighbor clustering procedure begins by counting the total number N of L-graph objects that have been identified. Then, an array of N list-pointers is allocated and initialized; each list-pointer points to a linked list of L-graph object pointers. Initially, each list contains a single pointer to a single L-graph object. These linked lists represent simple clusters with their elements being cluster representatives. Therefore, there are initially as many clusters as there are L-graph objects (N) and the distance between two initial clusters is the same as the distance between L-graph objects they contain. However, after initial clusters have been merged into new clusters, the distance between two merged clusters must be updated. When the distance between L-graphs "i" and "j" (i<j) is less than a threshold value, L-graph object "i" is modified to point to the L-graph object "j". This operation is performed for all pairs (i, j). The first list to be inspected corresponds to the first L-graph object (i=1) and the last inspected list corresponds to the last L-graph object (i=N). Elements that follow the cluster representative (first element) in the list cannot represent a different cluster. Therefore, they are skipped from the set of cluster representatives (i.e., corresponding list-pointers in the array of list pointers and replaced by "NULL"). This means that certain lists, out of the initial set of N Lists, are not inspected. These lists are partial lists, which are already included in one of the lists that has been inspected. When there are no more lists for inspection, the set of cluster representatives is complete and each of these representatives is the first element of a linked list containing all the members of each of the clusters.

The procedure for populating the data structure shown in FIG. 7 is illustrated in FIG. 8. As shown therein, procedure 8000 begins with an initialization stage 8100 which includes steps 8150 through 8350. Steps 8150 and 8200 are directed to allocating memory space for cluster indices 7010 of FIG. 7 (step 8150) with corresponding linked lists for each cluster index (step 8200). The next step 8250 entails storing pointers in the cluster index array 7010. Then, pointers for each of the graph objects are placed in respective elements of the arrays created in step 8200. Finally, a counter k is initialized to a value of zero at step 8350.

A second stage of procedure 8000 entails an iteration stage 8400. In this stage, a counter l is initialized at step 8450 and the distance between the kth and lth L-graph objects is calculated at step 8500. It is also determined whether that distance is lower than a predetermined threshold value. The preferred process of calculating this distance is described above with reference to FIGS. 6 through 6" and the preferred threshold value $d_T$ has been empirically determined to be $d_T=0.2 (D_{max}-D_{min})+D_{min}$. If the distance between the two L-graphs compared is greater than the threshold $d_T$ no clustering between these two objects occurs and the l counter is incremented at step 8550. The procedure 8000 also returns to step 8500 for the calculation of distance values for other L-graphs. If the distance between the two L-graphs is determined to be less than the distance threshold $d_T$ the two arrays are effectively merged into one, i.e., clustered together (see step 8600).

A determination of whether the first L-graphs have been compared with all others occurs at step 8750. If not, the l counter is incremented and steps 8500 through 8750 are repeated. If so, it is determined whether each subsequent L-graph has been compared with all of the L-graphs objects at step 8800. If not, the k counter is incremented at step 8850 and the process repeats steps 8450 through 8800. If so, the process simply ends at step 8900.

In effect, the clusterization procedure 8000 described immediately above compares the data of every L-graph object with the data of every other L-graph object and clusters together those objects which meet predetermined conditions of similarity. Once this has occurred, an L-graph which is most representative of each cluster is selected to be the cluster representative for respective clusters and a library of cluster representatives 2050 is generated. In the preferred implementation, cluster representatives are simply first elements in the linked lists containing cluster members. Other implementations (such as selecting as representative the element that is the closest to the centroid of the cluster) are possible.

The data structure of this library is preferably an array containing pointers to the selected cluster representatives with an indication of which object is representative of which cluster. Once the library of cluster representatives 2050 (see FIG. 2) has been generated, interpretation of these representatives and subsequent generation of interpreted text can occur.

With joint reference to FIGS. 2 and 9 through 12, the structure of apparatus for and methods of interpreting cluster representatives will be described. With initial reference to FIGS. 2 and 9, however, one can appreciate the interpretation of cluster representatives on a high level. As shown therein, a selector of cluster representatives module 2060 preferably selects individual cluster representatives from the cluster representative library 2050. These representatives are then passed to interpreter module 2070 for interpretation. The output of interpreter 2070 is preferably ASCII code corresponding to the L-graphs received from selector 2060. The details of this interpretation process follow.

Figure 9:
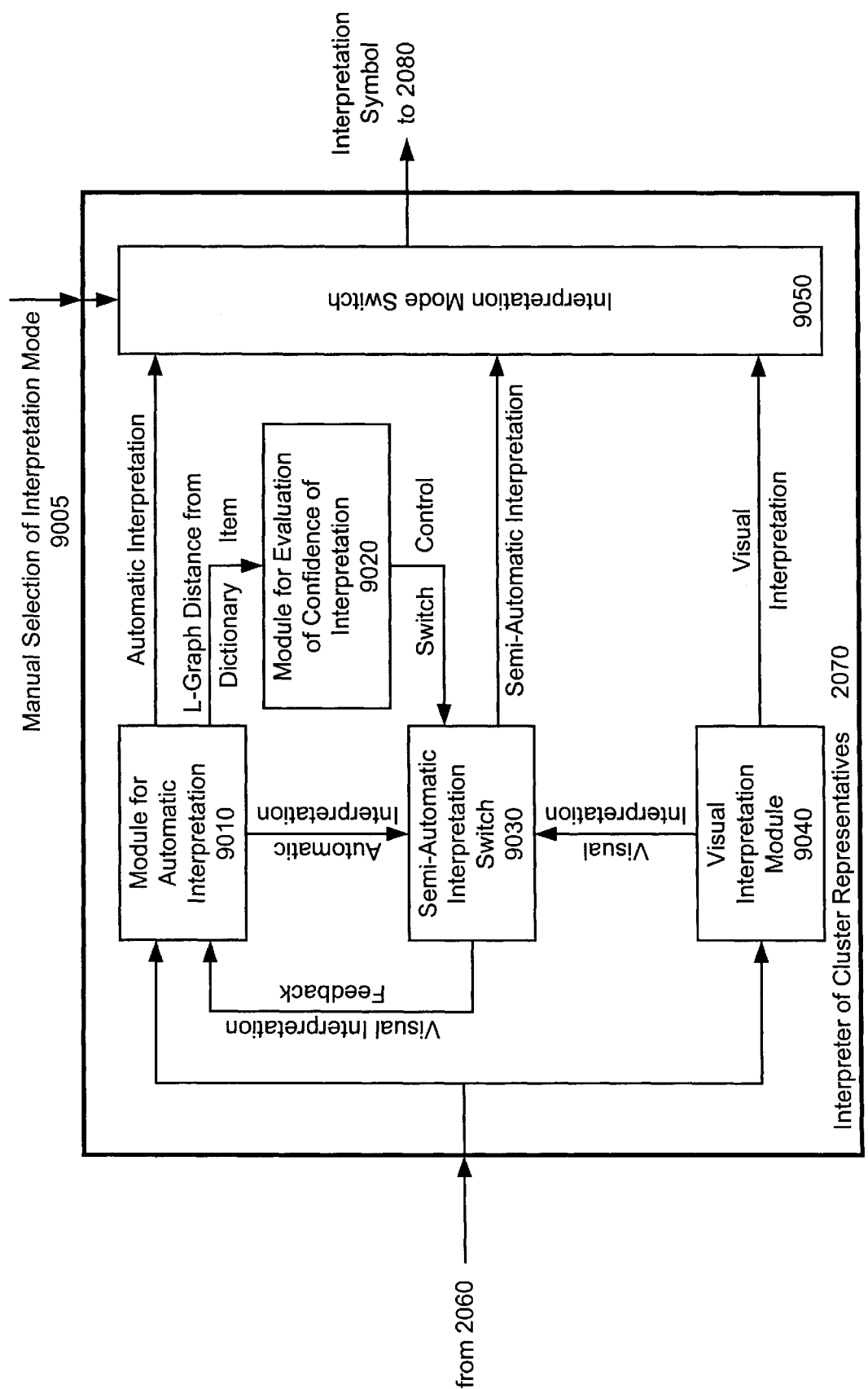
FIG. 9 is a block diagram illustrating in greater detail some of the features of the interpreter module 2070 shown in FIG. 2.

A more detailed representation of interpreter 2070 is shown in FIG. 9. As shown therein, interpreter 2070 includes an automatic interpretation module 9010, a semi-automatic interpretation switch 9030, a visual interpretation module 9040, a module for evaluation of interpretation confidence 9020 and an interpretation mode switch 9050.

The interpreter 2070 operates in one of three different modes. The three modes of operation are the automatic, semi-automatic, and visual modes. The mode in which the interpreter 2070 operates is preferably dictated by a user's manual selection of the interpretation mode switch 9005. This interpretation-mode selection is inputted to the interpretation mode switch 9050 which then dictates operation of interpreter 2070.

In the visual interpretation mode, information is outputted to a user for evaluation and selection of an appropriate interpretation. When the selection has been manually performed, the appropriate selection is outputted from the visual interpretation module 9040 as an interpretation symbol 2080. Optionally, this information could be used to populate the dictionary of known objects as described below.

In the automatic mode, interpreter 2070 automatically interprets the information received and the resulting symbol is outputted as the interpretation symbol 2080.

The semi-automatic interpretation mode is a hybrid of the automatic and visual nodes. In this mode, both the automatic and the visual interpretation processes might be utilized.

In particular, in the semi-automatic mode an initial attempt at automatic interpretation is performed. If the automatic interpretation is successful, then the selected symbol is outputted as interpretation symbol 2080. If automatic interpretation fails, then the user is queried to make an appropriate selection via a visual interpretation as described above. Once that has been done, the selected symbol is outputted as the interpretation symbol 2080. Additionally, if visual interpretation is required, data associated with that interpretation is preferably sent back into the module for automatic interpretation 9010. This feature permits improved and expanded recognition or interpretation capabilities and will be described in greater detail below.

Figure 11A:
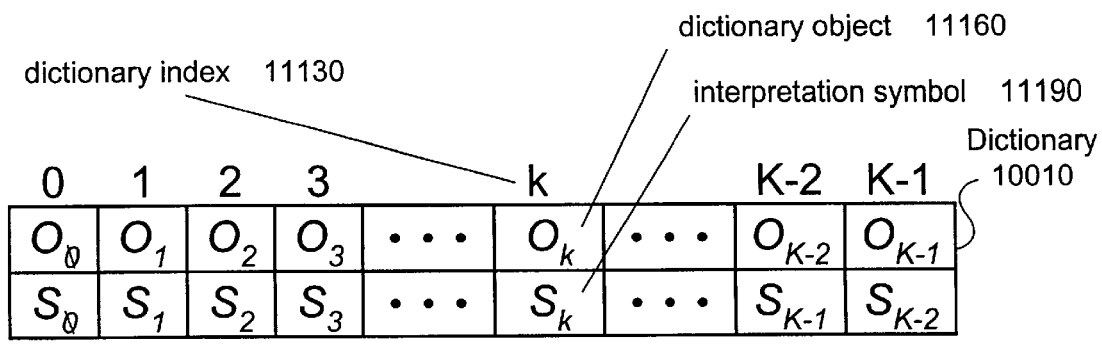
FIG. 11a illustrates one preferred data structure for a reference dictionary of known objects of the present invention.
Figure 11B:
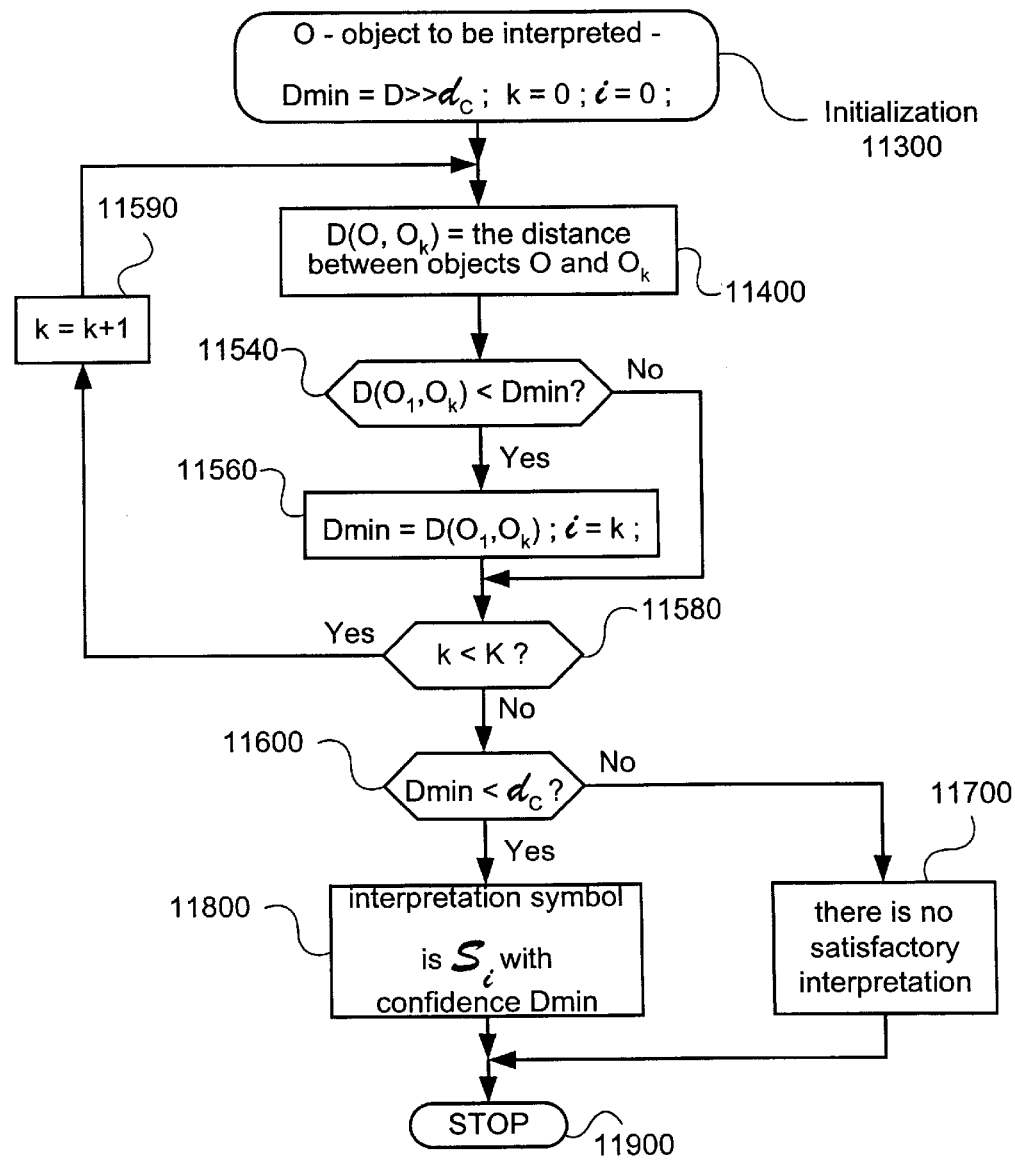
FIG. 11b illustrates one preferred procedure for automatically interpreting cluster representatives of the present invention.
Figure 12:
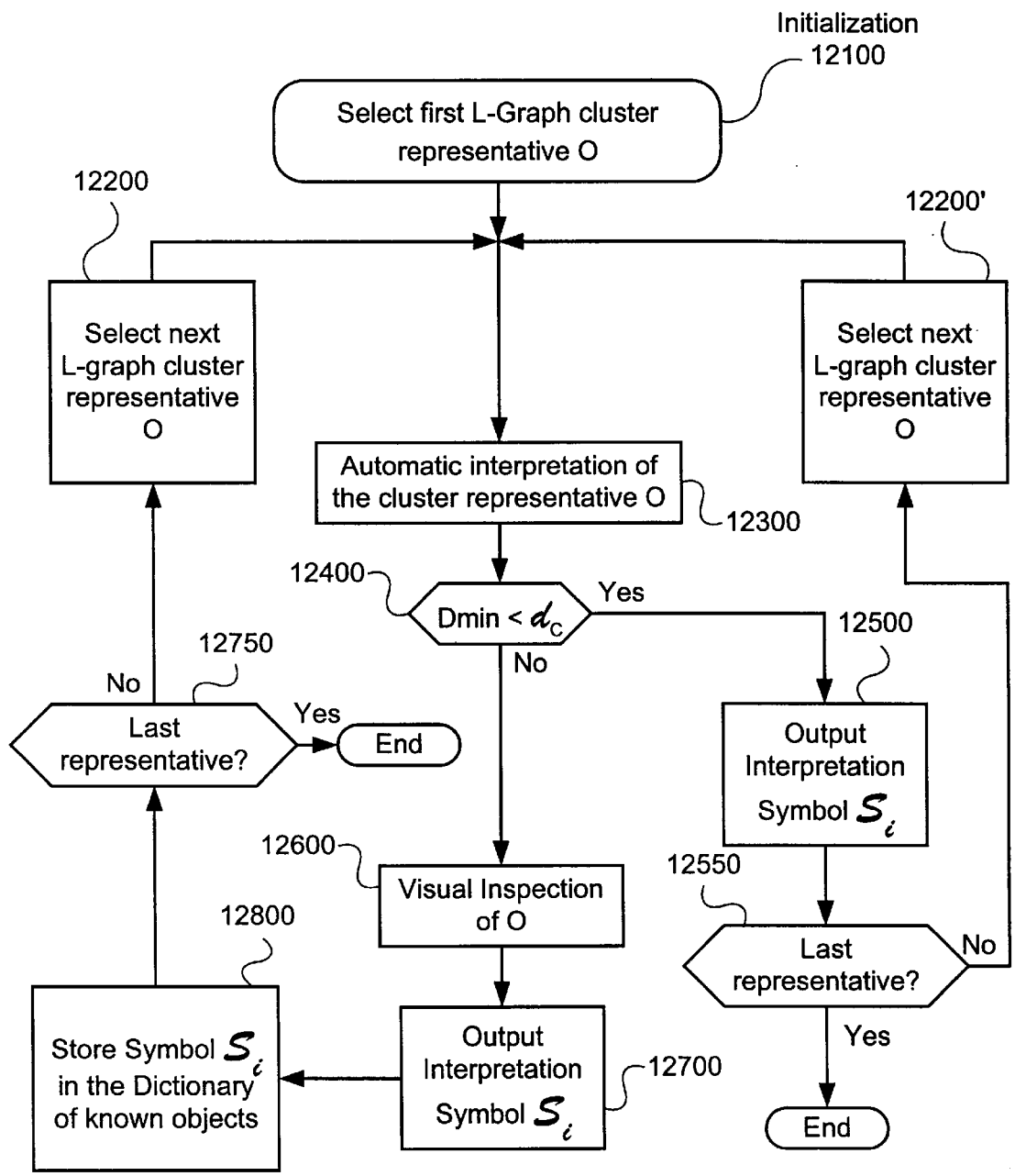
FIG. 12 illustrates one preferred procedure for semiautomatically interpreting cluster representatives of the present invention.

The modules and processes for semi-automatic interpretation can be better understood with reference to FIG. 12. As shown therein, procedure 12000 describes operation of interpreter 2070 in the semi-automatic mode in greater detail. Procedure 12000 begins with selection of a first L-graph cluster representative (see step 12100). Then, a step 12300 for automatic interpretation of the selected cluster representative is attempted. The details of this comparison are preferably directly analogous to the comparison between two L-graphs during clusterization described above. Additionally, this will be described in greater detail with respect to FIGS. 11a and 11b.

Automatic interpretation of the cluster representative will result in generation of a distance value. In step 12400 it is determined whether this distance value is greater than or less than a predetermined threshold distance value. The preferred distance threshold (the degree of confidence for the distance between objects) has been empirically determined to be $d_c=(1-c)D_{max}+cD_{min}=0.2D_{max}+0.8D_{min}$, where $D_{min}$ and $D_{max}$ are respectively minimal and maximal distances encountered in the image 2010 of FIG. 2. However, values of between about c=0.8 and about c=0.95 could also be used.

If the calculated distance value is less than the threshold, the automatically interpreted symbol is outputted at step 12500. Then, it is determined whether there are any other cluster representatives to be interpreted at step 12550. If not, the process ends. If so, another cluster representative is selected at step 12200 and the process repeats.

If the calculated distance value is greater than the predetermined threshold, visual inspection of the cluster representative occurs at step 12600. The result of visual inspection is the manual selection (i.e., interpretation) of an appropriate symbol at step 12700. The procedure 12000 then stores the selected symbol in the dictionary of known objects at step 12800. If there are no other cluster representatives to be evaluated at step 12750 the process terminates. If there are other representatives, the next one is selected at step 12200 and the process repeats until no more cluster representatives need to be evaluated. At this point, the procedure 12000 terminates.

Figure 10:
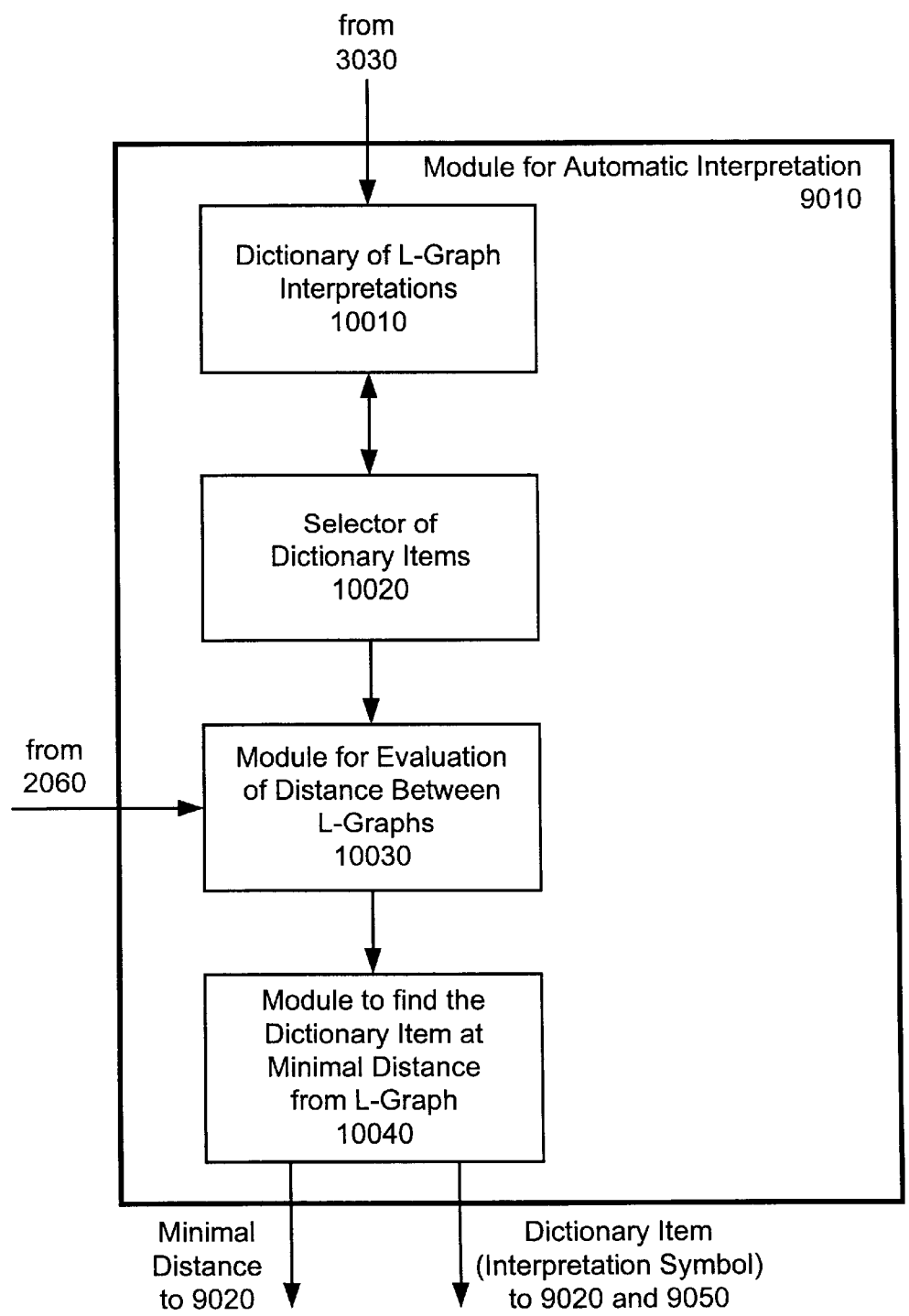
FIG. 10 is a block diagram illustrating in greater detail some of the features of the automatic interpretation module 3010 shown in FIG. 9.

A deeper understanding of the automatic mode of interpretation will be achieved with reference to FIGS. 10 through 11b. With initial reference to FIG. 10, the module for automatic interpretation 9010 is shown in greater detail. This module preferably includes a reference dictionary 10010 of (a dictionary of known objects with corresponding L-graph representations), a selector 10020 of dictionary items, a module 10030 for evaluation of distance between L-graphs and a module 10040 to find the dictionary object at minimal distance from a given L-graph.

As shown, dictionary 10010 can be updated by receiving visual interpretation data via semi-automatic interpretation switch 9030. Dictionary 10010 is, however, preferably initially populated with a series of predetermined objects having a data structure corresponding to the preferred L-graphs as discussed above.

Automatic interpretation commences with the receipt by module 10030 of a cluster representative via selector 2060 to be interpreted (see FIG. 2). Additionally, module 10030 receives via selector 10020 objects from dictionary 10010. The mathematical distance between the L-graph of the cluster representative and the L-graph of each of the dictionary objects is then calculated at module 10030. The preferred process for determining the distance between L-graphs is described above with respect to FIGS. 6 through 6". This process results in a table for each cluster representative being interpreted. The table includes pointers to each object in dictionary 10010 and associated distance values which are indicative of the mathematical distance between the cluster representative under consideration and respective dictionary objects. This table is then passed to module 10040 where the dictionary object most similar to the cluster representative is selected. This selection preferably entails finding the table entry with the minimal distance value and retrieving the associated dictionary object. Once this has occurred the minimal distance is outputted to module 9020 for further analysis. Additionally, the dictionary item which corresponds to the selected dictionary object is sent to modules 9020 (during semi-automatic interpretation) and module 9050 (during automatic interpretation).

The data structure of dictionary 10010 of known objects is shown in FIG. 11*a*. As shown therein, dictionary 10010 includes dictionary indices such as index 11130, a set of dictionary objects such as object 11160, and a set of corresponding interpretation symbols such as symbol 11190. Interpretation symbols 11190 are preferably simple ASCII codes representing various well known characters. The dictionary objects are, in actuality, preferably pointers to L-graph representations of the associated ASCII characters. Dictionary indices are preferably simply indices for corresponding pairs of L-graphs and ASCII symbols. Those with ordinary skill in the art will readily appreciate that a wide variety of other character schemes could be utilized instead of ASCII codes. Such other schemes include variable codeword length codes exemplified by prefix codes, and in particular, by Huffman code for message compression. Others will readily occur to those of ordinary skill in the art.

The procedure 11000 for determining which, if any, dictionary objects most closely match with a cluster representative is illustrated in FIG. 11*b*. As shown therein, initialization 11300 occurs when a cluster representative to be interpreted is selected and the index of the current dictionary item ("k"), the minimal distance encountered so far ("$D_{min}$"), as well as the index of the dictionary item corresponding to that distance (index "i" of the currently closest dictionary item) are initialized. Then, step 11400 is executed wherein the distance between the cluster representative and a first dictionary object is calculated (i.e., the respective L-graph objects data are compared).

At step 11540, a determination is made whether the distance between the cluster representative and the first dictionary object is less than a minimal distance encountered so far. If not, the process executes steps 11580 and 11590 and repeats as described below. If so, the values of the minimal distance encountered is updated 11560. Then, a determination is made whether there are any other dictionary objects to be compared with the cluster representative (see step 11580). If so, the k counter is incremented at step 11590 and the process repeats steps 11400 through 11580.

Once the final dictionary object has been evaluated, the minimal distance encountered so far ("$D_{min}$") becomes the minimum of all distances from dictionary items to the object to be interpreted. The object in the dictionary with minimal distance is then evaluated to determine whether or not this interpretation is good enough. This is preferably achieved by comparing the confidence level $d_c$ associated with "$D_{min}$" to a threshold value (see step 11600).

As already mentioned, the confidence level $d_c$ of a distance is preferably $d_c=0.2D_{max}+0.8D_{min}$, where $D_{min}$ and $D_{max}$ are respectively minimal and maximal distances between L-graph objects encountered in image 2010 of FIG. 2. If the minimal distance calculated is greater than the threshold distance $d_c$, an indication is made at step 11700 that there is no satisfactory interpretation in the dictionary. Otherwise, the interpretation symbol associated with the dictionary object at minimal distance from the object to be interpreted is outputed (see step 11800). In either case, procedure 11000 terminates at step 11900.

The overall effect of executing procedure 11000 is to determine which, if any, of the dictionary objects is sufficiently similar to a particular cluster representative so that the dictionary object can be substituted for the cluster representative. The process, therefore, interprets the cluster representative as being the selected dictionary object. Once this has occurred for each of the cluster representatives, the group of selected dictionary objects can be substituted for respective cluster representatives. Additionally, the selected dictionary objects can also be substituted for members of respective clusters.

Since each dictionary L-graph object requires far less memory than the corresponding bit map image of the particular object, the present invention enables the recognition and storage of data which would otherwise be too unwieldy. Since transmission of dictionary objects is far more efficient than transmission of bit map data, the present invention also enables far more efficient transmission of data.

While the present invention has been described in connection with what is presently considered to be the most practical and preferred embodiments, it is to be understood that the invention is not limited to the disclosed embodiments, but is intended to cover the various modifications and equivalent arrangements included within the spirit and scope of the appended claims.

What is claimed is:

1. A method for representing a connected component object within a graphic image as a lumped graph, said method comprising the steps of:

identifying a connected component object from the image;

representing the connected component object as a plurality of pixel runs contained in a plurality of pixel rows each having at least one of the pixel runs;

determining, for each pixel run, the connectivity relationship between the pixel run and at least one other pixel run;

identifying characteristic topological features of the object from the connectivity relationships determined for each pixel run of the object; and substituting the identified characteristic topological features for at least some of respective ones of the pixel runs;

wherein the step of identifying characteristic topological features comprises the substeps of:

identifying, as beginning nodes, those pixel runs which have no connectivity relationship with any pixel runs in an adjacent preceding pixel row;

identifying, as end nodes, those pixel runs which have no pixel relationship with any pixel runs in an adjacent subsequent pixel row;

identifying, as hinge nodes, those pixel runs which have a connectivity relationship with at least one pixel run in an adjacent preceding pixel row and connectivity relationships with more than one pixel run in an adjacent subsequent pixel row;

identifying, as hinge nodes, those pixel runs which have connectivity relationships with more than one pixel run in an adjacent preceding pixel row and a connectivity relationship with at least one pixel run in an adjacent subsequent pixel row; and identifying, as stroke nodes, those pixel runs which have a connectivity relationship with a single pixel run in an adjacent preceding pixel row and a connectivity relationship with a single pixel run in an adjacent subsequent pixel row.

2. The method of claim 1, wherein the step of substituting comprises:
representing, as respective strokes in the lumped graph, each series of identified stroke nodes which are adjacent to one another.

3. The method of claim 2, further comprising the steps of:
generating a feature vector of characteristic topological features of the connected component object from the lumped graph.

4. The method of claim 3, wherein the step of generating a feature vector of characteristic topological features further comprises:
representing the hinge nodes as an element of the feature vector.

5. The method of claim 3, wherein the step of generating a feature vector of characteristic topological features comprises:
determining the number of strokes in the connected component object; and
representing the number of strokes in the connected component object as an element of the feature vector.

6. The method of claim 3, wherein the step of generating a feature vector of characteristic topological features comprises:
representing each of the beginning nodes as an element of the feature vector.

7. The method of claim 6, wherein the substep of representing each of the beginning nodes further comprises:
determining for each beginning node the number of connectivity relationships between the beginning node and subsequent runs in the object; and
representing the connectivity relationships of each beginning node as an element of the feature vector.

8. The method of claim 6, wherein the step of generating a feature vector of characteristic topological features comprises:
representing each of the end nodes as an element of the feature vector.

9. The method of claim 1, wherein all of the pixel runs are identified as being one type of node from the types comprising a beginning node, a hinge node, a stroke node and an end node when the step of identifying characteristic topographical features has been completed.

10. A method for representing a connected component object within an image as a lumped graph, said method comprising the steps of:
representing each run of consecutive pixels of a first binary value of the object as a node;
determining, for each node, a connectivity relationship between the node and at least one other adjacent node;
representing, as a beginning node, each node which has no connectivity relationship to immediately preceding nodes;
representing, as a hinge node, each node which has connectivity relationships to at least one immediately preceding node and to more than one immediately subsequent node;
representing, as a hinge node, each node which has connectivity relationships to more than one immediately preceding node and to at least one immediately subsequent node; and
representing, as a single stroke, adjacent nodes which have connectivity relationships to a single immediately preceding node and a single immediately subsequent node.

11. A computer readable medium containing a computer program for representing a connected component object of a graphic image as a lumped graph, the program comprising modules for:
identifying a connected component object from the image;
representing the connected component object as a plurality of pixel runs arranged in a plurality of parallel pixel rows;
determining for each pixel run connectivity relationships between the pixel run and each pixel run in at least one adjacent pixel row;
identifying characteristic topological features of the object from connectivity relationships determined for each run of the object; and
substituting identified topological features, for at least some of the pixel runs;
wherein the step of identifying characteristic topological features comprises the substeps of:
identifying, as beginning nodes, those pixel runs which have no connectivity relationship with any pixel runs in an adjacent preceding pixel row;
identifying, as end nodes, those pixel runs which have no pixel relationship with any pixel runs in an adjacent subsequent pixel row;
identifying, as hinge nodes, those pixel runs which have a connectivity relationship with at least one pixel run in an adjacent preceding pixel row and connectivity relationships with more than one pixel run in an adjacent subsequent pixel row;
identifying, as hinge nodes, those pixel runs which have connectivity relationships with more than one pixel run in an adjacent preceding pixel row and a connectivity relationship with at least one pixel run in an adjacent subsequent pixel row; and
identifying, as stroke nodes, those pixel runs which have a connectivity relationship with a single pixel run in an adjacent preceding pixel row and a connectivity relationship with a single pixel run in an adjacent subsequent pixel row.

12. The computer readable medium of claim 11, wherein the computer program further comprises a module for:
extracting a feature vector of characteristic topological features of the connected component object from the lumped graph.

13. A method for recognizing a connected component object of an image as one of a plurality of known objects in a reference dictionary, the dictionary having lumped graphs with characteristic topographical features associated with the known objects of the dictionary, the method comprising the steps of:
identifying a connected component object from the image;
representing the connected component object as a lumped graph with characteristic topological features which define the object;
determining a distance between the lumped graph of the connected component object and the lumped graphs of at least some of the known objects;
determining the known object at a minimal distance from the lumped graph; and
responsive to the minimal distance being less than a threshold confidence value, interpreting the connected component object as the known object;
wherein the step of identifying characteristic topological features comprises the substeps of:

identifying, as beginning nodes, those pixel runs which have no connectivity relationship with any pixel runs in an adjacent preceding pixel row;

identifying, as end nodes, those pixel runs which have no pixel relationship with any pixel runs in an adjacent subsequent pixel row;

identifying, as hinge nodes, those pixel runs which have a connectivity relationship with at least one pixel run in an adjacent preceding pixel row and connectivity relationships with more than one pixel run in an adjacent subsequent pixel row;

identifying, as hinge nodes, those pixel runs which have connectivity relationships with more than one pixel run in an adjacent preceding pixel row and a connectivity relationship with at least one pixel run in an adjacent subsequent pixel row; and identifying, as stroke nodes, those pixel runs which have a connectivity relationship with a single pixel run in an adjacent preceding pixel row and a connectivity relationship with a single pixel run in an adjacent subsequent pixel row.

14. An apparatus for interpreting a bi-level connected component object of a document having plural connected component objects, the apparatus comprising:

an image segmenter for identifying the connected component object from the document and for representing the identified object as plural pixel runs of a given binary value;

an L-graph builder, which receives the pixel runs from the image segmenter, for determining connectivity relationships between the received pixel runs and for generating an L-graph representation of the identified object, the L-graph of the identified object comprising plural feature vectors reflecting the determined connectivity relationships between the received pixel runs;

a dictionary of plural known connected component objects, the dictionary having plural dictionary L-graph representations associated with respective ones of the dictionary objects, each of the dictionary L-graphs comprising plural feature vectors reflecting the structure of an associated dictionary object; and an interpreter operatively associated with the L-graph builder and with the dictionary, the interpreter receiving the L-graph of the identified object and at least one dictionary L-graph and for comparing the feature vectors of these L-graphs with one another to thereby interpret the identified object as being at least one of the dictionary objects.

15. The apparatus of claim 14 wherein the L-graph builder determines which of the adjacent pixel runs of the identified object have identical connectivity relationships and represents these pixel runs as a single stroke feature vector.

16. The apparatus of claim 14 wherein the image segmeter represents the identified object as a linked list of pixel run data which does not specify the connectivity relationship between the pixel runs.

17. The apparatus of claim 14 wherein the dictionary of known objects can be updated by adding the identified object and the associated L-graph to the dictionary under predetermined conditions.

18. The apparatus of claim 14 wherein the dictionary objects are stored in the dictionary as ASCII characters and wherein the interpreter outputs from the apparatus the ASCII character of the dictionary object which most closely matches the identified object.

19. The apparatus of claim 14 wherein the interpreter can operate in any one of an automatic mode, a semi-automatic mode and a visual mode, the mode of operation being determined in response to a predetermined condition.

20. The apparatus of claim 14 wherein the pixel runs received by the L-graph builder represent runs in substantially parallel pixel rows and wherein the L-graph builder generates feature vectors representing four types of nodes;

a beginning node feature vector being generated for those pixel runs which have no connectivity relationship with any pixel runs in an adjacent preceding pixel row;

an end node feature vector being generated for those pixel runs which have no connectivity relationship with any pixel runs in an adjacent subsequent pixel row;

a hinge node feature vector being generated for those pixel runs which have a connectivity relationship with at least one pixel run in an adjacent preceding pixel row and connectivity relationships with more than one pixel run in an adjacent subsequent pixel row;

a hinge node feature vector also being generated for those pixel runs which have connectivity relationships with more than one pixel run in an adjacent preceding pixel row and a connectivity relationship with at least one pixel run in an adjacent subsequent pixel row; and a stroke node feature vector being generated for those pixel runs which have a connectivity relationship with a single pixel run in an adjacent preceding pixel row and a connectivity relationship with a single pixel run in an adjacent subsequent pixel row.

21. The apparatus of claim 20 wherein the L-graph builder substitutes a single stroke feature vector for each group of adjacent stroke node feature vectors.

22. An apparatus for interpreting unknown bi-level connected component objects, each of the unknown objects being represented as plural pixel runs of a given binary value, the apparatus comprising:

an L-graph builder for determining the connectivity relationships between the pixel runs of each unknown object and for generating an L-graph representation of each unknown object, each L-graph comprising plural feature vectors reflecting the determined connectivity relationships of the unknown object;

a dictionary of plural known connected component objects, the dictionary having plural dictionary L-graphs associated with respective ones of the dictionary objects, each of the dictionary L-graphs comprising plural feature vectors reflecting the structure of its associated dictionary object; and an interpreter operatively associated with the L-graph builder and with the dictionary, the interpreter receiving the L-graphs from the L-graph builder and from the dictionary and comparing the feature vectors of the L-graphs with one another to thereby interpret the unknown objects as being at least one of the dictionary objects.

23. The apparatus of claim 22 wherein the L-graph builder determines which of the adjacent pixel runs of the identified object have identical connectivity relationships and represents these pixel runs as a single stroke feature vector.

24. The apparatus of claim 22 wherein the dictionary of known objects can be updated by adding the identified object and the associated L-graph to the dictionary under predetermined conditions.

25. The apparatus of claim 22 wherein the dictionary objects are stored in the dictionary as ASCII characters and, wherein the interpreter outputs from the apparatus the ASCII character of the dictionary object which most closely matches the identified object.

26. The apparatus of claim 22 wherein the interpreter can operate in any one of an automatic mode, a semi-automatic mode and a visual mode, the mode of operation being determined in response to a predetermined condition.

27. The apparatus of claim 22 wherein the pixel runs received by the L-graph builder represent runs in substantially parallel pixel rows and wherein the L-graph builder generates feature vectors representing four types of nodes;

a beginning node feature vector being generated for those pixel runs which have no connectivity relationship with any pixel runs in an adjacent preceding pixel row;

an end node feature vector being generated for those pixel runs which have no connectivity relationship with any pixel runs in an adjacent subsequent pixel row;

a hinge node feature vector being generated for those pixel runs which have a connectivity relationship with at least one pixel run in an adjacent preceding pixel row and connectivity relationships with more than one pixel run in an adjacent subsequent pixel row;

a hinge node feature vector also being generated for those pixel runs which have connectivity relationships with more than one pixel run in an adjacent preceding pixel row and a connectivity relationship with at least one pixel run in an adjacent subsequent pixel row; and a stroke node feature vector being generated for those pixel runs which have a connectivity relationship with a single pixel run in an adjacent preceding pixel row and a connectivity relationship with a single pixel run in an adjacent subsequent pixel row.

28. The apparatus of claim 27 wherein the L-graph builder substitutes a single stroke feature vector for each group of adjacent stroke node feature vectors.

29. An apparatus for interpreting bi-level connected component objects, each of the unknown objects being represented as plural pixel runs of a given binary value, the apparatus comprising:

an L-graph builder for generating an L-graph representation of each object;

a clusterizer, which receives L-graphs of the objects, for clustering L-graphs meeting a condition of similarity and for selecting a cluster representative for each of the clusters;

a library of cluster representatives populated with the representative L-graphs selected by the clusterizer;

a dictionary of plural known connected component objects, the dictionary having plural dictionary L-graphs associated with respective ones of the dictionary objects; and an interpreter operatively associated with the library and with the dictionary, the interpreter receiving L-graphs from the library and from the dictionary, comparing the L-graphs with one another to thereby interpret each cluster representative and its associated cluster members as being one of the dictionary objects and outputting from the apparatus a single dictionary object for all members of each respective cluster.

* * * * *